United States Patent [19]

Stowe et al.

[11] Patent Number: 5,138,676
[45] Date of Patent: Aug. 11, 1992

[54] MINIATURE FIBEROPTIC BEND DEVICE AND METHOD

[75] Inventors: David W. Stowe, Medfield; Paul W. Fitzgerald, Southbridge; Frederick J. Gillham, Westboro, all of Mass.

[73] Assignee: Aster Corporation, Milford, Mass.

[21] Appl. No.: 539,010

[22] Filed: Jun. 15, 1990

[51] Int. Cl.$^5$ .............................................. G02B 6/26
[52] U.S. Cl. ................................. 385/32; 385/123; 385/31; 385/43
[58] Field of Search ............... 350/96.15, 96.20, 96.21; 385/123, 31, 32, 43

[56] References Cited

U.S. PATENT DOCUMENTS

| | | | |
|---|---|---|---|
| 4,083,625 | 4/1978 | Hudson | 350/96.15 |
| 4,136,929 | 1/1979 | Suzaki | 350/96.15 |
| 4,253,727 | 3/1981 | Jeunhomme et al. | 350/96.15 |
| 4,256,365 | 3/1981 | Lemesle et al. | 350/96.18 |
| 4,291,940 | 9/1981 | Kawasaki et al. | 350/96.15 |
| 4,315,666 | 2/1982 | Hicks, Jr. | 350/96.15 |
| 4,342,499 | 8/1982 | Hicks, Jr. | 350/96.15 |
| 4,386,822 | 6/1983 | Bergh | 350/96.15 |
| 4,482,203 | 11/1984 | Stowe et al. | 350/96.15 |
| 4,493,528 | 1/1985 | Shaw et al. | 350/96.15 |
| 4,906,068 | 3/1990 | Olson et al. | 350/96.2 |
| 5,011,251 | 4/1991 | Miller et al. | 350/96.2 |

FOREIGN PATENT DOCUMENTS

53-91752 8/1978 Japan.
2126749A 3/1984 United Kingdom.

OTHER PUBLICATIONS

Szarka et al., "A Review of Biconical Taper Couplers", Fiber & Integrated Optics vol. 3 #2-3, 1980.
Campbell, "Jaws-A Coupler for Computer Rings", SPIE, vol. 479, 1984, p. 86.
Olshansky, "Propagation in Galss Optical Waveguides", Reviews of Modern Physics, vol. 51, No. 2, Apr. 1979, pp. 341-367.
Gillham, et al., "Designer's Handbook: Fiber Optic Couplers for Multiplexing", Photonics Spectra, Apr. 1984.
S. K. Sheem, et al., "Single-mode fiberoptical power divider: encapsulated etching technique", Optics Letters, vol. 4, No. 1, Jan. 1979, p. 29.
Synder et al., "Bends" Optical Waveguide Theory, Chapter 23, Chapman and Hall Ltd., pp. 474-486 (1983).
Sharma, et al., "Constant-Curvature Loss in Monomode Fibers: An Experimental Investigation," Applied Optics, vol. 23, No. 19, pp. 3297-3301.

Primary Examiner—Akm E. Ullah
Assistant Examiner—Stephen W. Barns
Attorney, Agent, or Firm—Fish & Richardson

[57] ABSTRACT

Bends in optical fibers can be miniaturized by reducing the diameter of a section of the fiber in the region where bending is desired to a condition in which the optical properties of the fiber have reduced bend-loss sensitivity. In one aspect of the invention, radii of curvature less than 100 microns ($\mu$) and very low optical power loss are achieved. A fiber with such specially reduced diameter may also be twisted about its longitudinal axis to a greater degree than a comparable length of larger diameter fiber. Any optical fiber can be processed by redrawing and/or chemical means to allow such bending or twisting. Bend or twist tolerant regions thus formed may be packaged separately or built integrally into a wide range of fiber optic components, networks, or systems with significant space savings, added performance features and mechanical flexibility.

45 Claims, 13 Drawing Sheets

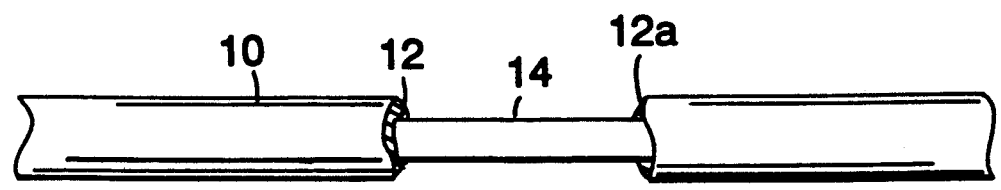
FIG. 1a
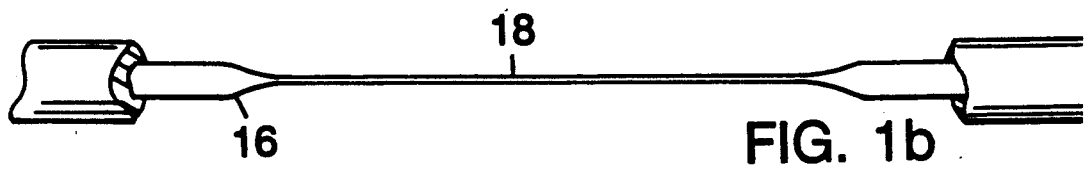
FIG. 1b
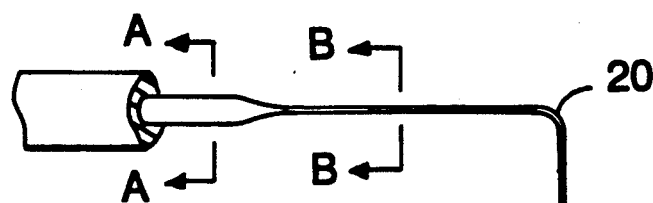
FIG. 1c
FIG. 1d
FIG. 1e

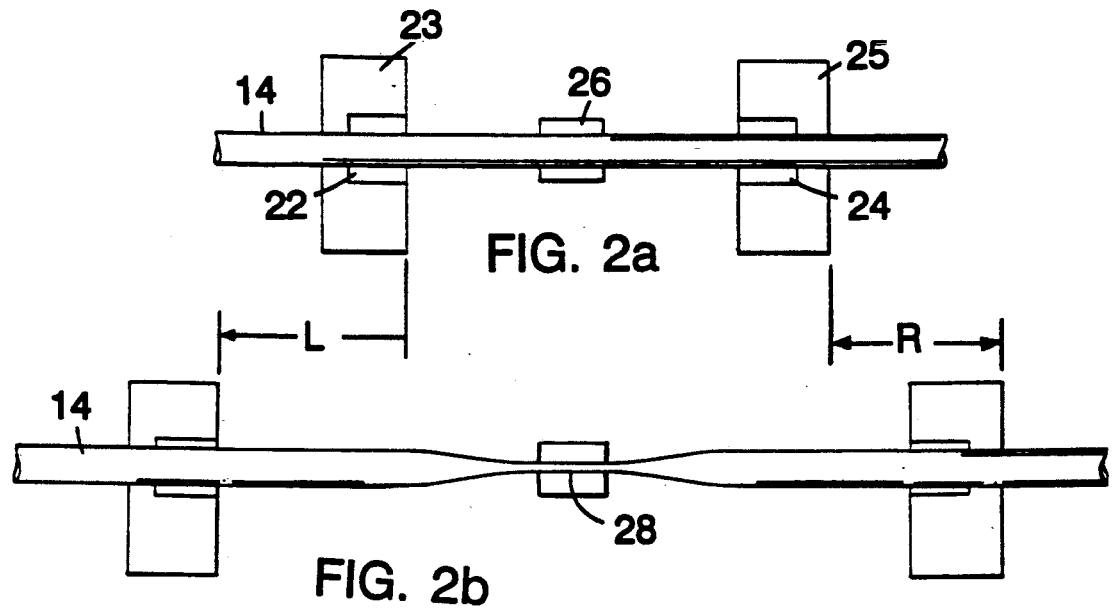
FIG. 2a
FIG. 2b
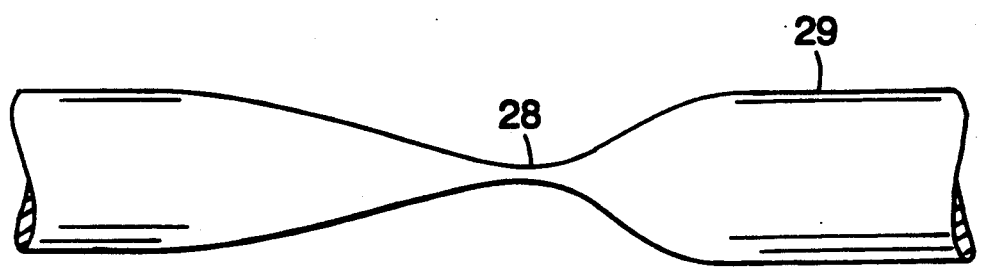
FIG. 3

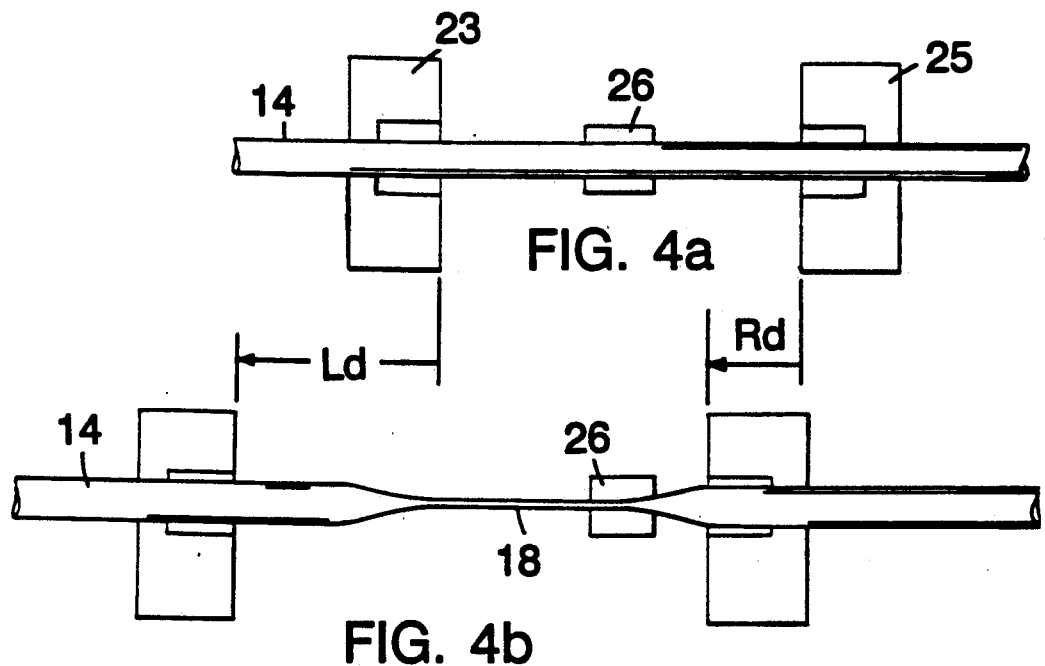
FIG. 4a
FIG. 4b
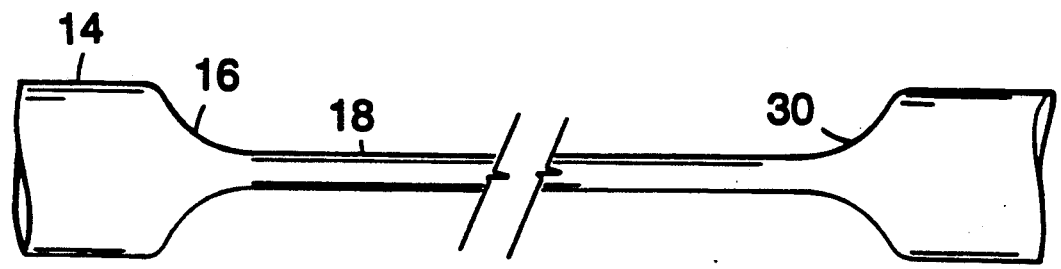
FIG. 5

MINIATURE FIBEROPTIC BEND DEVICE AND METHOD

FIELD OF THE INVENTION

The invention relates to bending optical fibers with no appreciable loss of optical power and without fracturing the fiber. The invention also relates to twisting optical fibers without incurring breakage or loss of optical power. The invention further relates to packaging electro-optical and fiberoptic components in greatly reduced package volumes. The invention further relates to a family of new, miniaturized fiber routing components.

BACKGROUND OF THE INVENTION

All types of optical fibers become lossy when bent. As the radius of bend curvature is decreased more and more light is lost. As the length of fiber bent into a curved shape increases, there is a corresponding increase in optical power loss that increases with the length of bent fiber and the reciprocal of the bend radius. These factors limit the radii of bends allowable in an assembly of fiber optic components.

Bending or twisting an optical fiber creates stresses in the fiber which lead to increased susceptibility to stress-induced failure. As the bend radius is decreased or the degree of twisting is increased, these stresses may lead to abrupt breakage. Fibers which are bent in relatively large radii are also subject to asymmetrical internal stresses and may fail after some unpredictable time period.

These forms of fiber breakage are of considerable concern to component and system designers. The size and physical layout of stationary fiber optic components and system elements is dictated to a large degree by the space needed to route fibers around bends without incurring excessive optical power loss or enhancing the chance of long-term stress-induced breakage.

In some applications it is necessary to provide flexible mechanical couplings between two or more devices interconnected by optical fibers. In such cases the interconnecting fiber is bent or twisted dynamically. When a fiber is bent dynamically the intensity of the optical signal passing through the bend is modulated. Compensating for the time varying bending loss modulation of signal power complicates the design of systems and may, in fact, prove impossible. For example, fiber optic sensors mounted on moving machine parts such as the arm of an industrial robot must be connected to optical sources and receivers by an optical fiber. Motions of the robot arm cause bends and bend related optical power loss in the interconnecting fiber. Hence the received signal from the sensor varies as the arm moves. If these variations exceed the dynamic range of the sensor instrumentation, compensation is not possible.

In other applications it is advantageous to use fibers to interconnect optical elements which may rotate relative to one another. Optical fibers in these cases are subjected to twisting. Considerable effort has been expended to develop rotary fiber optic joints to meet such demands. Prior efforts have resulted in an expensive component which requires extreme precision of manufacturing to ensure fiber alignment. Typically a rotary joint consists of two main parts that are free to rotate relatively about a common longitudinal axis. In each of these parts, an optical fiber is rigidly mounted precisely on the center of the axis of rotation. When assembled these two parts act to butt the ends of the fibers together and align the cores of the two separate fibers. When the two parts are rotated, the cores of the butted fibers must remain in alignment or variations of the signal power result, again, such variations in signal power are troublesome.

A particularly important application of optical fiber is in the fabrication of telecommunications circuits, networks and devices. An example is a fiber optic transceiver used to send and receive data on optical fibers. Typically such a transceiver comprises a set of electronic circuits which perform the functions of coupling an external device such as a computer workstation or telephone modem into a power amplifier suitable to drive a laser diode or LED light source. Other circuits control the bias point of the light source and may control the temperature of the light emitting junction. These elements of electronics comprise the transmitter portion of the transceiver. The result is that light is emitted according to desired power, optical wavelength, data bandwidth, and optical bandwidth criteria. This optical signal is then coupled into an optical fiber and routed in some manner out of the package enclosing the circuitry.

Other circuits in a typical transceiver package include a photodetector and amplifier to recover the optical signal fed into the package on an optical fiber. Once amplified these signals are usually conditioned by other circuits to match the required electrical input/output characteristics of the user's terminal equipment.

In many situations the same fiber is used to carry the optical signal in and out of the transceiver. A means of optical beam splitting is employed to separate the outgoing optical signal from the incoming optical signal. One such beam splitting means of current popularity is the fiber optic coupler. A fiber optic coupler can be made to be as small as about 2 cm long by roughly 5 mm in diameter. The electronics for the transceiver can be fabricated using standard dual in-line package (DIP) technology with the result that the electronics occupy about 2 cubic inches. It is difficult to configure a package using an internal fiber optic coupler because the radius of bends in the fibers entering and leaving the coupler must be greater than 1 cm. Careful circuit board layout can, however, result in a package of shape and volume dictated by the electronic component. Such a package has considerable application, but it is limited. For example, it would not fit neatly into any modern telephone handset.

For size reasons alone, many electronic functions are fabricated using miniaturized devices. Surface mount device (SMD) technology is becoming very popular for the advantages it offers in size reduction. With the size reduction also comes an increased speed ability. SMD technology and the similar hybrid circuit technology are well suited to data rates in excess of 50 megabits per second. Fiber optics are also suited to high data rate applications. It is quite natural that designers seek to incorporate the advantages of miniaturized circuit technologies with optical fiber systems. The electronics for a transceiver like the one described above, when built using SMD occupies less than 0.75 cubic inches. There is, however, no previously known way to route the fibers inside the package without bends that increase the volume unacceptably, therefore, the fiber optic coupler becomes the limiting item in final package size.

It is therefore desirable to provide a means by which optical fibers can be bent or twisted without incurring excessive losses or susceptibility to stress related breakage.

SUMMARY OF THE INVENTION

The invention is applicable to any optical fiber comprising a solid transparent core and a solid transparent outer clad layer with a portion of the clad layer of index of refraction less than that of the core such that the fiber conducts light by internal reflection attributable to the difference in index of refraction between the core and the solid clad layer.

According to the invention, a selected length of the fiber, in a region where the exterior of the fiber is exposed to an external environment having an index of refraction substantially lower than that of the solid clad layer, is reduced in diameter in a manner to cause the fiber to conduct light by internal reflection attributable at least in part to the difference in index of refraction at the interface between the exterior of the fiber and the external environment. By this means light energy can be transmitted through the region with substantially lower bend-loss than that of the main length of the fiber, and it is in this region that the fiber is oriented differently, e.g. bent and/or twisted relative to an adjacent portion of the fiber, without causing substantial light loss attributable to the orientation.

Because the invention enables the achievement of miniature bends relative to those heretofore achieved, the invention is sometimes referred to as the "miniature bend invention", but the concepts and contributions go far beyond that important achievement.

Various preferred embodiments have one or more of the following features. In the selected region, the fiber has a substantial bend so that the main length of the fiber on one side of the selected region is oriented at a substantial angle to the axis of the selected region or to the length of the fiber on the other side of the region, the lower index of refraction of the external environment at this bend enabling transmission of light energy through the bend with substantially less bend-loss than would occur if the bend were in the main length of the fiber. In various embodiments the bend angle is about 90° or about 180°. The radius of curvature of the bend is less than 1000 times the radius of the core of the unaltered main length of the fiber. The selected region is bent tightly around a small diameter support and in certain embodiments the selected region is wrapped a multiplicity of turns around the small diameter support.

In preferred embodiments, the exterior of the fiber is exposed to air, vacuum, or transparent fluid in the selected region.

In preferred embodiments, the optical fiber has a transition region joining the selected region in which the thickness of the clad decreases gradually toward the selected region, the transition region having increased bend-loss-sensitivity, this transition region having a substantially straight orientation. Such embodiments preferably have one or more of the following features. The transition region tapers to smaller diameter in the direction of the selected region. In the transition region, the clad reduces in thickness and the core reduces in diameter toward the selected region as the result of draw-formed taper of the fiber. The transition region and the selected region are the product of etching away of a portion of the so id clad and draw-forming. The selected region is the product of etching away of at least most of the solid clad. A transition region of the kind described lies on each side of the selected region and joins a portion of the main length of the fiber. These features are important to the achieving of single mode fiber embodiments but also can be used to advantage in certain multimode fiber embodiments.

In other multimode fiber embodiments, in the multimode fiber, in a region adjacent the selected region, the clad is substantially removed while the core retains a sufficient diameter to guide substantially all light modes guided by the main length of the fiber. In such embodiments preferably in the selected region, where there is no clad, the selected region of the core is reduced from that of the main length of the fiber, the bend or other orientation occuring in the reduced diameter region.

Preferred embodiments in which the fiber is bent comprise important specific devices. One of these is an optic connector device. Preferably in such a device the fiber optic path extends from a fiber butt end forming a connection interface having a first axis of orientation through the bend to a fiber portion having an axis lying at a substantial angle to the first axis.

Another important use of the invention is to realize an improved joint assembly in which regions of the fiber adjacent the selected region are secured in respective members of a joint which are movable with respect to each other to a limited extent with corresponding bending of the selected region. In one particular embodiment, the joint assembly is in the form of a slip joint wherein the fiber in the selected region is bent into the form of a helical coil such that when the members move toward each other the helical coil is compressed and when the members move away from each other the helical coil is expanded. In another particular embodiment, the joint assembly is in the form of a rotary joint wherein the adjacent regions of the fiber are secured in members of the joint, the members being rotatable with respect to each other about an axis defined by the fiber in the selected region, the rotation twisting the fiber.

Another important use of the invention is to realize improved optic couplers. In one case where the optic coupler device is formed of a plurality of optic fibers, an extension of one of the fibers forms a fiber optic path having a sharp bend, e.g. 90° and in important instances 180° realized according to the invention. In a fused fiber optic coupler device that comprises at least two of the fiber optic paths containing 180° bends, the substantial bends of the fiber optic paths are fused to form a coupling region of the device.

Other important devices achievable by the invention are as follows. An electro-optic device incorporating the fiber optic coupler incorporating a miniature bend. A package comprising first and second optical components mounted on a rigid support and connected by the fiber optic path having a miniature bend, in some cases the first optical component being an optic coupler and the second component selected from the group consisting of light emitters and light detectors; in other cases the package comprises a transceiver comprising a coupler, a light emitter and a light detector. A coil wherein the fiber in the selected region is bent into the form of a helical coil or an angled fiber optic connector device comprising such coil. An angled fiber optic connector device comprising a miniature coil wrapped about a small diameter support. A phase modulator device comprising a miniature coil wrapped about a small diameter support wherein the support is expandable and contractible in a direction perpendicular to an axis of the support, the expansion and contraction modulating a length of the fiber in the selected region in the wrapped small diameter support effectively causing a phase shift in light passing through the phase modulator with respect to light passing through an independent reference light path. An interferometer incorporating the phase modulator just described. The phase modulator just described wherein the support is piezoelectric. A fiber optic connector device wherein a miniature bend is suspended in a void within the connector housing. A resonator comprising a fiber optic path bent about 360° forming a loop and the selected region is fused to itself or otherwise coupled in the form of a very high coupling ratio coupler, e.g. high coupling ratio being about 99% or more. Such a resonator wherein the loop comprises a second coupler in the form of a very low coupling ratio coupler, e.g. the low coupling ratio being about 10% or less. A twisted fiber optic coupler device comprising at least two fiber optic paths having 180° miniature bend wherein the bends of the fiber optic paths are twisted about one another to form a coupling region of said device. A miniature bend network bus comprising at least one of the 180° fiber optic paths wherein the substantial bend of said fiber optic path is coupled to an optic fiber with a coupling ratio less than about 1%.

According to another aspect of the invention, a method is provided for reducing the allowable bending radius of an optical fiber, comprising reducing the cross-sectional area of a region of the fiber sufficiently to reduce the optical power loss and mechanical stresses associated with bending in the region of reduced cross-sectional area.

As the above summary suggests, the advantages of the invention accrue from the novel alteration of the light guiding properties of conventional fibers realized when the waveguide cross-section is deliberately reduced within a length of original fiber. One aspect of the invention is a region of reduced fiber cross-sectional area, e.g., reduced diameter, in a continous length of optical fiber wherein the reduced cross-sectional area region is made solely for the purpose of facilitating the bending or twisting of the optical fiber. A region of reduced cross-sectional area has optical and mechanical properties different from those of the original fiber. Those differences, which shall be discussed herein, are used advantageously in the invention.

Optical fibers usually have circular cross-sections. We shall proceed to discuss the invention with a circular cross-section in mind, but fibers with elliptical, rectangular, square, or irregular cross-sections exist and benefit from the principles of the invention. References to cross-sectional "diameter" herein are not intended to imply a limitation of the invention to fibers with circular cross-sections. Most generally, any cross-sectional shape can be substituted within the scope of the invention. Normally it is expected that in order to maintain essentially lossless operation of an optical fiber the radii of any bends in the fiber must be several thousand times the diameter of the core of the fiber. Since optical fibers typically have core radii of five microns (5 $\mu$) or more, bend radii of two or more centimeters is common practice.

According to the invention, single mode fibers can be processed to achieve regions of extremely small diameter without incurring significant loss of optical power due to the diameter reduction. Single mode fibers with original cladding diameters ranging from 50 $\mu$ to over 100 $\mu$ are reduced to less than 1 $\mu$ total diameter in the reduced region with the result that bend radii in the range of 100 $\mu$ are achieved with optical power loss in the range of 1 percent. As has been indicated, the achievable reduction in bend radius is not proportional to the reduction of fiber diameter alone but also depends on the optical properties that will be discussed more fully below.

With multimode fibers the miniature bend invention also enables low-loss small-radius bends, however, if the fiber is reduced in diameter so much that the effective mode volume of the reduced diameter region is less than the mode volume filled by the input optical excitation of the original fiber, additional losses will occur. Two distinct varieties of multimode fibers exist: step index profile and graded index profile. A parabolic graded index profile multimode fiber has one half the mode volume of a step index profile fiber. According to the invention, after processing a graded index fiber into a reduced diameter section, the graded index profile is effectively transformed into a step index profile in the region of reduced diameter. The mechanism which accounts for this phenomenon will be discussed shortly. Therefore, a graded index fiber may be reduced about twice as much as a step index multimode fiber of equivalent initial mode volume without incurring loss due to the reduction in mode volume. Following the diameter reduction, multimode fibers can be bent around radii in the 1.0 millimeter range with very low loss.

The invention therefore has wide applicability, to both multimode and single mode optical fibers and, by proper processing techniques can be used advantageously on fibers of any known material composition or cross-sectional shape.

In both single mode and multimode fibers, the optical mechanism which allows the significant reduction in bend radius relates to the change of waveguide structure accompanying diameter reduction. Optical fibers typically have a core with index of refraction $N_1$ somewhat greater than the index of the surrounding cladding material $N_2$. It is customary to characterize the relationship between core and cladding indices by a percentage difference $\Delta$ (delta) defined by equation 1 below. The term, delta, is sometimes called the profile parameter.

$$\Delta = (N_1^2 - N_2^2)/2N_1^2 \qquad (1)$$

Delta usually ranges from 0.001 to 0.030 with most fiber materials. This means that $N_1$ and $N_2$ are very nearly the same and often in the range of 1.5. Such fibers are referred to as weakly guiding fibers because of the low value of index difference. The greater the value of delta, the less susceptible a fiber to bending losses.

When the diameter of the fiber is reduced, for example by heating and redrawing the heated region, the cladding and core diameters are both reduced. Eventually the outer diameter of the reduced fiber becomes so small that the original cladding material is no longer effective as a cladding. The fiber becomes essentially clad by the surrounding medium. In the event that the surrounding medium is air, the value of $N_2$ decreases to 1.0. For typical cores having $N_1$ in the range of 1.5, this results in an increase in delta of about 100 fold. Because of this dramatic increase in delta, the reduced diameter fiber is able to guide light around much smaller bends than the original fiber.

For parabolic profile fibers, it can be seen that the original graded index cladding material is replaced by a surrounding medium such as air thus effectively transforming the fiber into a step index profile in the processed region. This accounts for the above mentioned effective transformation of graded index to step index for multimode fibers thus processed.

Tapering of the core must be gradual and tapering of the clad in regions where the optical field is significant must be gradual and smooth to prevent mixing of the guided mode(s) with the non-guided modes such as radiation modes or cladding modes. Energy from a guided mode coupled to a radiation mode escapes out of the fiber and is radiated away and no longer is guided and carried by the fiber, for example. With smooth, gradual tapering, light energy that in the untapered fiber conventionally had been primarily guided through the core by internal reflection at the core/clad interface begins to spread into the clad region and starts to interact with and effectively become guided by internal reflection at the interface between the clad and the external environment, preferably air or vacuum for least light loss. Essentially, the reduced diameter fiber as a whole functions as a core guiding the light energy with the external environment functioning effectively as cladding. Typically, a single mode fiber with an outer diameter of about 125 $\mu$ is reduced by a factor of 25 down to about 5 $\mu$ while the original core of about 9$\mu$ is reduced down to 9/25 $\mu$, virtually indistinguishable from the original clad material, with the light energy spread fairly uniformly throughout the reduced diameter fiber.

In applications where it is important to minimize light loss, it is crucial that the gradual, smooth tapering transitional region be held almost perfectly straight because the transitional region is one of enhanced and increased bend sensitivity.

Another, equivalent way of viewing the physics of the invention is in terms of evanescent waves. The tapering and elongating of the fiber in drawing provides a means for the light energy being carried by the original core of the fiber to adiabatically spread from the original core and to be carried more by evanescent waves in the original cladding. This is a spreading of the fundamental propagated mode and not a coupling and conversion of the fundamental mode to a cladding mode. Eventually, the adiabatically spreading fundamental mode contacts the cladding/external environment interface. There is not a coupling between one mathematical mode with another which would constitute an energy loss, for example if the fundamental mode were to couple with a higher order mode. Rather, there is a gradual evolution in the mathematical structure of the equations, a smooth interpolation between the solutions to the equations before and after the tapering in which the fundamental mode remains fundamental even though the situation after tapering corresponds to a fundamental mode being guided by the whole reduced diameter fiber acting as a core with an external environment acting as cladding. Thus, it is necessary to maintain a gradual, smooth, adiabatic tapering in the transition region that is also held straight to avoid undue perturbation of the evanescent light energy that could cause mode coupling and light loss. With etching, an abrupt initial etch is fine as long as one has not perturbed the portion of the clad containing the fundamental evanescent mode energy. Thereafter, the etching, too, must be smooth and gradual in the sense that the etch diameter changes smoothly along the length of the fiber axis or else an etch shoulder is created that can also cause mode coupling and light loss. A key aspect to the success of the miniature bend invention is the preservation of the evolving fundamental mode through the transition region and through the miniature bend.

There are a number of methods by which a fiber can be processed to reduce the diameter in a short region. Above we mentioned redrawing the fiber. This simple procedure requires that the unjacketed optical fiber be heated along a length of a few millimeters until the fiber material reaches a suitable working temperature. The fiber is then drawn so as to elongate the heated region resulting in a gradual taper between the original fiber and the region of reduced cross-sectional area. When done properly the reduced region has nominally uniform cross-section throughout the effective length of reduction.

Alternatively, fibers may be etched using, e.g., a solution of hydrofluoric acid. Etching, as discussed herein includes all forms of molecular processing. Therefore, plasma etching, ion milling, solvent processing, and any other means relying on the chemical properties of the fiber are considered to be means of etching. Fibers may also be reshaped by mechanical means such as by grinding or polishing. In practice a combination of means often is best to achieve a particular desired final diameter or an intermediate diameter or shape suitable for secondary processing to the final reduced cross-sectional shape.

To get to the miniature bend region quicker, for instance, one can first etch the fiber and then taper by redrawing. This is the preferred method for processing multimode fibers. Where the core is relatively large and confines all the modes, the initial etching can be quite abrupt, removing most of the cladding without affecting the propagating light modes. It is important to etch or taper very gradually once the portion of the cladding is reached that carries the evanescent mode light.

The etch first and then taper technique has the advantage of making the overall device shorter because the transitional region is shortened. Etching tends to be more complicated and harder to control than simple redrawing and tapering alone, so simple redrawing is preferred with most single mode fibers. If one wanted to work with depressed clad fibers, on the other hand, it would be necessary to etch off most or all of the outer, less deeply depressed clad region of the fiber before it was tapered because otherwise there could be coupling between the core and the outer, less deeply depressed clad, where depressed means that the clad has a lower refractive index. Immediately surrounding the core is the most deeply depressed clad glass with the lowest refractive index which is surrounded by less deeply depressed clad glass. Relative to the most deeply depressed clad, it is as though there is another core in the outer regions of the fiber which must be etched away before the redrawing and tapering to prevent coupling and light loss.

Typical step index multimode fibers have a 50 $\mu$ diameter core and 125 $\mu$ diameter cladding with a step in the index of refraction between the two. The number of propagating modes carried by such a fiber is approximately $V^2/2$, where V is the normalized frequency defined by the formula $V = (2\pi/\ )r_c - (N_1^2 - N_2^2)$, is the wavelength of the light energy of interest and $r_c$ is the radius of the core of the optical fiber, $N_1$ is again the refractive index of the core and $N_2$ is again the refractive index of the clad. If one directly redraws and tapers such a fiber, since V is proportional to the core radius $r_c$, as $r_c$ is reduced by the tapering, V immediately begins to decrease and the number of modes able to be carried by the tapering fiber decreases quadratically meaning mode dumping of higher mode light and increased light loss. By etching first down to the vicinity of the core, or even in some circumstances to the core and beyond, the fiber becomes effectively air or vacuum clad with a corresponding increase in V and in the number of modes able to be carried. Then tapering can reduce the diameter further to achieve the bend insensitive region allowing miniature bending of multimode fibers.

There are, however, some multimode fibers with cores so large and cladding so thin that etching may not be necessary because the amount of light lost by tapering first or by just tapering is small enough to be inconsequential. For example, with a fiber having a 100 μ diameter core and 125 μ or 140 μ diameter clad, the number of propagating modes lost upon immediate tapering is relatively small, usually the higher order modes that are likely to be lost anyway in transmission over long distances because of bending or imperfections of the fiber, an acceptable penalty to pay for reducing the diameter to make miniature bends.

In general, single mode fibers can achieve tighter miniature bends than can multimode fibers. Conversely, single mode fibers tend to be more bend hypersensitive in the transitional tapering regions than multimode fibers. Single mode fibers are inherently easier to control and understand simply by virtue of having only one propagating mode. Multimode fibers are advantageous, however, in situations where averaging effects of many modes are important. Single mode fibers are less expensive, as a rule, and tend to transmit light over greater distances.

There are occasions where one may taper a fiber by redrawing first and then etching. This is an effective way of smoothing and distributing the etch shoulder more uniformly along the length of the fiber.

Practical tests can be performed on the fiber during the processing to ascertain empirically when the drawing and tapering or etching have sufficed to achieve low light loss miniature bending. First, the fiber is processed while straight and is checked to make sure that the tapering or etching have not caused increased light loss. Second, the reduced diameter region is bent into the desired orientation and it is again checked to determine whether light loss has increased. Third, if light loss has increased due to the bending, the fiber is reprocessed, drawn more, tapered more or etched more and rebent and retested until light loss is reduced.

It is also possible to manufacture fibers initially with sections of reduced diameter spaced along the length of the fiber thus providing convenient specialty fibers for applications requiring the advantages of the invention.

An important feature of the invention is that single mode fibers of the invention can be bent in radii smaller than is possible for integrated optic waveguides. Therefore, with the invention it is possible to combine the features of integrated optics, e.g., the ability to perform branching, switching, modulating, etc. on a small optical substrate, with features of optical fibers, e.g., to obtain ease of coupling to sources and detectors and to provide low loss interconnecting pathways of arbitrary curvature between integrated optical functions on a substrate. With the invention it becomes possible and realistic to fabricate hybrid electro-optic integrated circuits using optical fiber interconnections between electro-optic elements and fiber optic elements in small package dimensions. The term "hybrid" here implies that optical fiber routing components can be made in a package size of a few square millimeters and can be subsequently mounted in a manner familiar to those skilled in the art of hybrid electronic packaging and surface mount device fabrication.

Mechanically a fiber of greatly reduced diameter can be bent or twisted more severely than can a similar length of original diameter fiber. The stresses resulting from bending are proportional to the diameter of the fiber and the reciprocal of the bend radius while the stresses from twisting are proportional to the diameter of the fiber and the degree of twist applied. The longer the length of reduced diameter, the greater the allowed degree of twisting. This is true because the torsional unit stress is inversely proportional to the length over which torsion occurs.

Fibers of greatly reduced diameter and relatively short length, e.g., 2 cm, can be twisted through many complete rotations before breaking. This provides the means to achieve a miniature rotational joint component featuring a continous length of fiber between units interconnected. Such a joint of the invention incorporates a single fiber fixed at both ends of a mechanical means comprising two axially aligned pieces which are free to rotate relative to one another about the axis. The fiber section between the fixed points, i.e., that section of fiber subject to twisting when the mechanical means are rotated, is of greatly reduced diameter. Fibers exiting from the rotational section are of original diameter and can be spliced into other fiber optics with very low loss. The entire assembly can be made very small, of the order of a few centimeters in length and about a centimeter in diameter, and produces no modulation of optical power in the fiber when rotated. There is, of course, a finite limit to the number of full twists allowed, but for many industrial machine operations, oscillatory rotations of plus or minus 45 angular degrees to plus or minus 360 angular degrees are common. The invention easily meets such requirements for a rotary joint. Similarly, hinge joints, linear translation joints, universal joints, and vibration isolators can be fashioned using the fiber optic methods of the invention.

The invention therefore provides means to reduce the packaging volume of fiber optic assemblies. It uniquely leads to a family of components which may be used as building blocks for integrated optic circuits, hybrid electro-optic/fiberoptic circuits, and fiber optic elements which are compatible with surface mount devices and manufacturing methods. It also provides advantageous means of routing optical fibers through mechanical interfaces and of incorporating optical fibers in applications heretofore impossible. These advantages and features will become more apparent from the following description of preferred embodiments and the claims. First we briefly describe the Figures.

BRIEF DESCRIPTION OF THE FIGURES

FIG. 1 shows an optical fiber in successive steps of cross-sectional area reduction including: a) a side view of fiber with jacket removed; b) a side view of fiber after diameter reduction; c) a side view of bent reduced fiber; and d) e) sections of the fiber cross-sectional area in the original and reduced regions.

FIG. 2 is a top view schematically illustrating a symmetrical bi-directional drawing method of reducing the fiber cross-sectional area: a) before drawing; and b) after drawing.

FIG. 3 illustrates the asymmetrical side view of a fiber drawn using a uni-directional drawing method.

FIG. 4 is a top view schematically illustrating a differential speed uni-directional drawing method: a) before drawing; and b) after drawing.

FIG. 5 is a side view of a fiber after differential speed uni-directional drawing.

FIG. 12 (b) illustrates such a coupler incorporating a minibend of the invention in one of its fibers.

DESCRIPTION OF THE PREFERRED EMBODIMENTS

Figure 6:
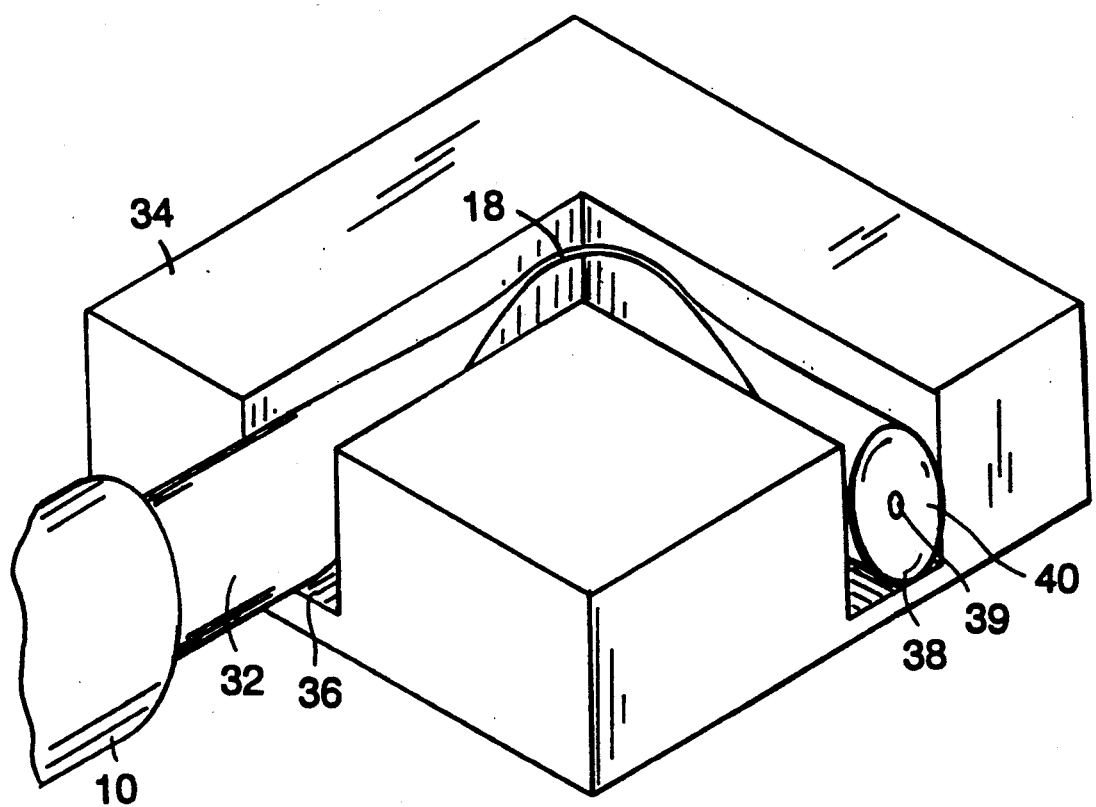
FIG. 6 is a three-dimensional view of a mounting means that fixes the angle of the miniaturized bend.

FIG. 1 illustrates the fundamental concept of the invention. An optical fiber 14 is usually enclosed in a jacketing material 10. The optical fiber 14 is exposed by cutting away a portion of the jacket as between 12 and 12a in FIG. 1a. By means to be discussed herein, the optical fiber 14 is processed so that a region of reduced cross-sectional area 18 results. Most forms of processing result in a smooth transmission 16 between the original fiber and the region of reduced cross-sectional 18 shown in FIG. 1b. The term cross-section here applies to sections A—A and B—B of FIG. 1c viewed into the axial direction of the fiber. The section A—A represents the original fiber and B—B the reduced fiber as further illustrated in FIG. 1d. In the region of reduced cross-sectional area 18, a bend 20 as illustrated in FIG. 1c can be much smaller than a bend in the original fiber.

The methods of reducing the cross-sectional area of a fiber include etching, machining, and drawing. Combination of these techniques can also be used. While the nature of the invention is independent of the process used to achieve the reduction, some preferred approaches are discussed here.

Drawing a fiber to reduce the cross-sectional area involves heating a region of the fiber to a suitable working temperature and pulling on one or both ends of the fiber so as to elongate the heated region. There are two distinct variations of this process. In the first, which we shall call "bi-directional drawing", the fiber is elongated simultaneously on either side of the center of the heated region. In the second, called here "uni-directional drawing", the fiber is elongated on only one side of the heated region.

Bi-directional drawing is accomplished by any method or mechanism that simultaneously moves both ends of the fiber away from the center of the heated region. A typical mechanism to accomplish this is illustrated schematically in FIG. 2a and 2b. A fiber 14, stripped of its protective jacket, is clamped by a left side 22 and a right-side 24 clamp to a left-side 23 and right-side 25 translation stage. Shown in FIG. 2a and 2b is only a short region of a much longer continuous fiber. The full extent of the fiber beyond the region to be processed has been omitted for graphic convenience. A source of heat 26 is located between the stages. Once the fiber is heated sufficiently, the stages are caused to move in opposite directions away from the center of the heated region 28 as shown in FIG. 2b. The arrows in FIG. 2 indicate the amount of translation in the left direction L and in the right direction R.

By moving the stages apart at the same rate relative to the center point 28, the fiber is drawn into a symmetrical bilateral taper. The cross-sectional area of the midpoint of the taper asymptotically approaches zero. Experience has shown that single mode fibers can be drawn from an original overall diameter of 130 $\mu$ to diameter of less than 0.1 $\mu$ with less than 1% excess loss of optical power throughput. The limiting factor in this process appears to be the control of the heat source necessary to prevent the microscopic fiber from vaporizing. I.e., the only time we experience significant loss is when the fiber eventually loses continuity. It would appear that fibers of diameter scarcely larger than their constituent molecules guide light essentially without loss. Practical use of fibers of such reduced size has never been noted. A symmetrically tapered fiber can be used to form any of the embodiments of the invention.

By moving the stages 23 and 25 away from the center 28 at different speeds, the taper formed will be asymmetrical. The degree of asymmetry depends upon the difference in speed. The greatest difference in speed between the two stages occurs when one stage stands still while the other moves. In this case we speak of unidirectional drawing.

Uni-directional drawing can be accomplished in two ways. First, as suggested above, one stage can be held fixed while the other is made to move away from the center of the heated region. FIG. 3 shows a tapered fiber longitudinal cross-section typical of the result obtained when the right-side translation stage is held stationary. The stationary side of the fiber is indicated by the numeral 29 in FIG. 3. Note that the resulting structure is an asymmetrical bilateral taper, i.e., the diameter always varies as a function of position along the fiber with the smallest diameter occuring approximately at the center 28 of the heated region. The asymmetry is characterized by the fact that the variation of diameter with longitudinal distance along the processed region of fiber is greater on the stationary side 29 of the center 28.

Another form of uni-directional drawing has particular importance to the invention. This method we refer to as "differential speed uni-directional drawing". (Please note that herein "speed" implies the absolute value of the stage velocity.)

Differential speed uni-directional drawing describes the novel and extrememly useful technique of moving both stages in the same direction at different speeds. This is illustrated schematically in FIG. 4. In FIG. 4a the section of the fiber to be processed 14 is set into the drawing assembly as described in the discussion of FIG. 2. Then one stage, say the left one 23, is made to move a distance indicated by the arrow labeled Ld away from the heated region 26 while the other stage 25 moves a distance indicated by the arrow labeled Rd toward the heated region 26 at a somewhat slower speed. The result of this method is a length of fiber of essentially constant reduced cross-sectional area 18 shown in FIG. 4b, FIG. 1, and enlarged in FIG. 5.

As shown in FIG. 5, the processed region of fiber 14 resulting from the differential speed uni-directional draw discussed in FIG. 4 gradually tapers 16 into a reduced cross-sectional area 18, but the reduced cross-sectional area remains constant over any desired length of processed fiber. The taper 30 on the side moved toward the heated region is more abrupt than the taper 16 on the side moved away from the heated region. Phenomenologically, the region of constant cross-sectional area 18 results because a steady state is reached wherein fiber material is fed into and extracted from the heated region 26 of FIG. 4 at the same rate. The cross-sectional area required for steady state material flow depends on the difference in speed between the left and right stage when both stages move in the same direction. Therefore, by calibrating the speeds of the stages, long sections of fiber with the same cross-sectional area and shape are produced, and the reduced area can be preselected by choosing a prescribed speed difference.

The concept of differential speed uni-directional drawing is familiar to those skilled in the art of manufacturing fibers from large preformed glass structures. In that common technique of fiber manufacturing, the large preform is fed vertically from above and very slowly into an oven creating a heated region at the lower end of the preform. Optical fiber is drawn downward out of the heated region at a much higher speed. The invention novelizes this concept to modify conventional fiber. Moreover, according to the invention, unidirectional differential speed drawing does not require a preform, uses a very small localized heat source such as a microtorch or focused laser beam, operates at relatively small speed differences, is used in the horizontal plane, and is used to reshape a relatively short length of existing fiber for the advantageous purposes of the invention.

Once the cross-sectional area of the fiber is reduced, numerous configurations of bends are possible. In the most general terms, a bend is characterized by a radius of curvature and a length of curvature. The radius of curvature may or may not be constant throughout the length of fiber subject to curvature. A related parameter used herein to describe some bends is the "angle of curvature". As used here the angle of curvature or bend angle is the angle between the longitudinal axes of the fiber entering and leaving the region of curvature.

Implicit in the discussion is the fact that a fiber with cross-sectional area of less than a few square microns requires some form of protective packaging. The various embodiments disclosed herein and the advantages of the invention open new dimensions of freedom to the designer of fixed and flexible fiber optic components. It is not the purpose of this disclosure to develop all such designs, but rather to indicate the scope of some presently embodied as well as foreseen applications of the invention.

Bends can be embodied in manners to fix one or more of the radii of curvature, the length of curvature, and the bend angle. For example, FIG. 6 illustrates a jacketed optical fiber 32 mounted in a right-angle grooved supporting structure 34. The jacket 10 is shown removed from the section of fiber entering the supporting structure as might result from the processing steps outlined in the discussion of FIG. 1. Here the reduced fiber 18 is bent around 90 angular degrees, but no feature of the structure necessarily implies a particular radius of curvature. Indeed, during manufacturing of such a component, great and unnecessary effort would be required to attain a certain radius of curvature. Nevertheless, it can be seen that the radius of curvature possible in this structure is very small. Typically the fiber can be reduced sufficiently that the mean or minimum radius of curvature is less than the diameter (or smallest overall cross-sectional dimension) of the original fiber. The entire structure of FIG. 6, according to the invention, therefore measures less than 3 millimeters on each side. Without the advantages of the invention the structure would have to measure over 2 centimeters on each side to avoid both excessive optical power loss and the risk of unpredictable breakage.

The bend embodiment depicted generally in FIG. 6 can be used as a minature right angle routing component, enabling a very short or small right angle change in direction of the optical fiber, giving virtually no light loss and having no wavelength dependence. If one thinks of the fiber as entering the structure at the point labeled 36 and exiting the structure at 38, the endface 40 of the exiting fiber might be polished to promote coupling to a photo diode, light emitting diode (LED), laser diode (LD), or for butt coupling to another optical fiber. Any of these devices can be fixed with appropriate bonding methods directly to the endface 40 of the fiber to align with the core 39. In embodiments of those types, the structure shown becomes a right angle pigtail device. Unlike any bending method previously known, this structure is small enough to fit within conventional photodiode, LED, and LD packages. In principle the photodiode can even be deposited directly on the polished end of the integral fiber/support structure.

On the other hand the fiber could be polished at both ends 36 and 38. Such an embodiment can be used as a surface mounted optical bend for routing optical power between elements in miniature electro-optic or integrated optic assemblies. Clearly angles other than 90 degrees and supporting structures more robust than that illustrated conceptually in FIG. 6 are envisioned within the scope of the invention.

Similarly, the concept of FIG. 6 can be extended to include convenient means of routing fibers around bends external to equipment packages. The fiber leaving at point 38 may continue beyond the edge of the bend supporting structrure. In that embodiment the structure is a miniature right angle bend useful in packaging fiber runs inside or external to fiber optic equipment.

Compact connectors featuring directional change between entry and exit points are fabricated using a miniature bend of the invention and a suitable mechanical supporting structure within the connector body. Such connectors are preferred in fiber optic cabling applications where space is saved by their use and where the directional change built into the connector prevents inadvertent abuse of the fiber exiting the connector into the external environment.

Figure 6A:
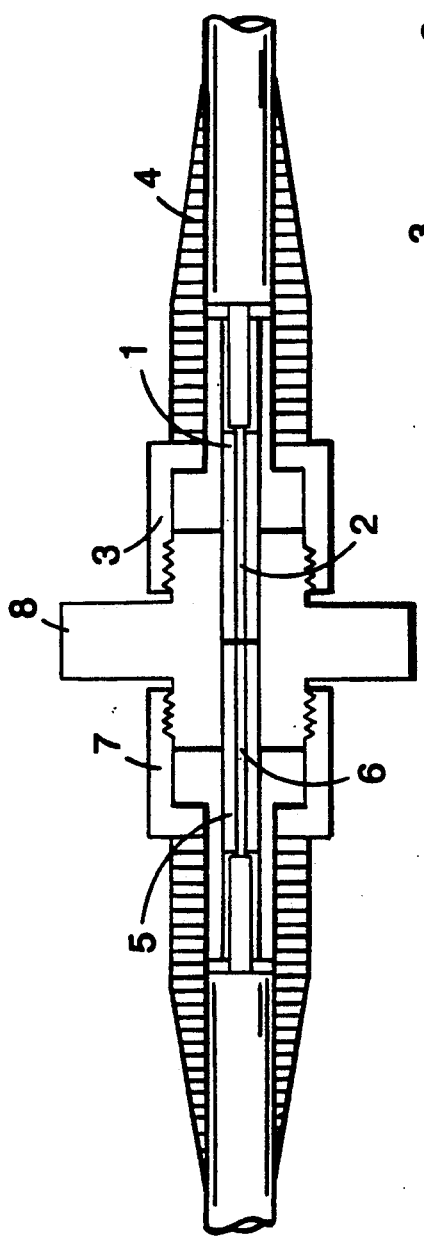
FIG. 6a is a sectional side view illustrating the main elements of a conventional connector.

Shown in FIG. 6a, a conventional fiber optic connector consists of two metal halves generally indicated by the numerals 3 and 7 which screw together often using a panel mounted adaptor 8. This allows the butt joint between optical fibers 2 and 6 entering through each half of the connector, much like an electric connector allowing contact between two wires. In both halves of the connector there are ceramic capillary tubes 1 and 5 with very tiny holes in which the fibers 2 and 6 are placed and polished and which are encased in the respective metal housings 3 and 7. Where fiber 2, e.g., emerges from the metal housing 3 there is a strain relief 4 which prevents fiber 2 from bending too much. The region beyond the strain relief is that in which fiber 2 would typically require several inches to bend over, a heavily cabled fiber easily requiring as much as six inches in which to bend.

Figure 6B:
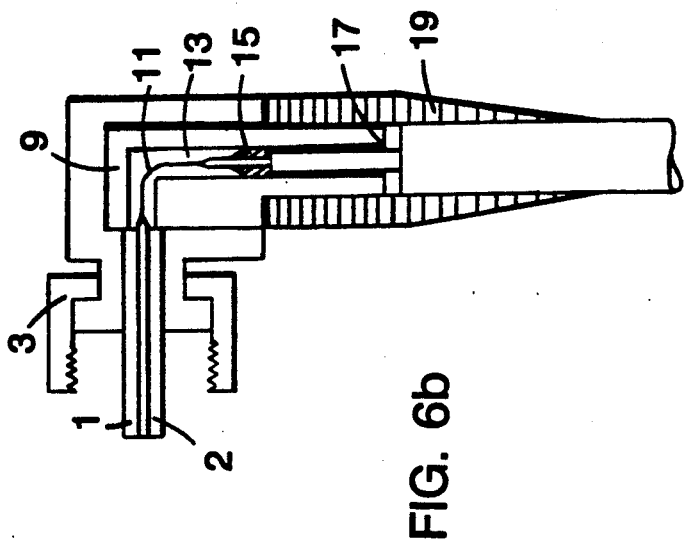
FIG. 6b is a sectional side view illustrating the main elements of a right angle connector featuring a miniature bend.

A connector incorporating the minibend invention is shown in FIG. 6b (showing only the right half of the connector, the left half being either the same or entirely conventional). The threaded part of the metal housing 3 and the ceramic capillary tube 1 are as before. However, at the backside of the capillary tube 1 is an altered piece 9 which contains the minibend 11 suspended in air in a void 13 of the piece 9 thereby avoiding minibend contact with any physical portion of the package. The fiber is anchored on one side of minibend 11 in the capillary tube 1 and on the other with additional adhesive at site 15, locking both sides of the minibend 11 firmly in place. In particular, the anchoring keeps the bend sensitive tapered regions of the fiber 2 on either side of minibend 11 straight, avoiding light loss. This anchoring of bend sensitive tapered regions is a feature commonly important to many embodiments for low light loss minibends. The fiber 2 emerges from the piece 9 at point 17 and enters a strain relief 19 similar to strain relief 4 in FIG. 6a and procedes conventionally. The new right angle connector in FIG. 6b gives a connector where the cabled portion of a fiber emerges at right angles with respect to the fiber entering the connector on the other side, making the overall connector a shorter, more robust device. When connectors are used by telephone companies in switching equipment, for instance, it is not uncommon for engineers to occasionally lean up against racks of connectors, leaning against the relatively fragile fibers of conventional connectors (as in FIG. 6a) that protrude from the racks. The sturdy metal housings of right angle minibend connectors (as in FIG. 6b) resist fiber damage resulting from such abuse, because with angled minibend connectors, the fibers do not protrude outward from the racks. In general, the right angle minibend connector is much more compact and can be fit into a much smaller volume, saving valuable space, e.g., in underground vaults or switching rooms crowded with equipment.

As another example, fiber optic cables leading to desktop equipment can be routed over the edge of the desk using a protective assembly comprised of a supporting structure to contain the miniature bend and suitable outer packaging to allow easy and esthetically pleasing. integration into the office environment. The bend supporting structure might appear similar to that illustrated in FIG. 6. Alternatively, the bend supporting structure might be made flexible to accommodate a broader range of potential needs.

Figure 7:
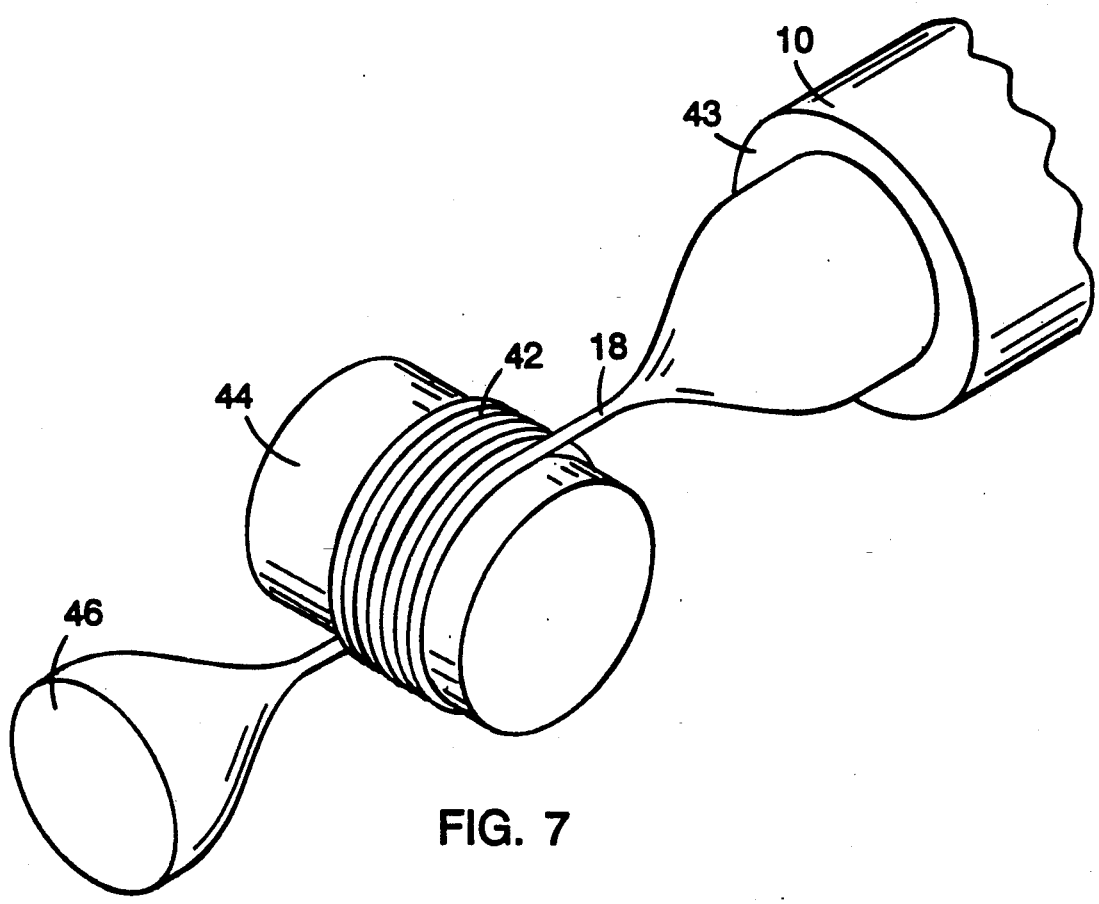
FIG. 7 is a three-dimensional view of a reduced fiber wrapped around a cylindrical object thus fixing the radius of the bend.

In another embodiment a bent fiber can be mounted in a manner to fix the radius of the bend curvature without necessary regard to the angle of the bend. Wrapping 42 a reduced fiber 18 around a cylindrical rod 44, for example, as shown in FIG. 7 accomplishes this end. In FIG. 7 is shown a section of jacketed fiber 10 with the jacket removed 43 from the reduced section 18 as previously discussed. The end of the fiber denoted 46 is shown truncated for graphic convenience. In practice the wrapped reduced fiber assembly depicted in FIG. 7 may be placed at any point in a continuous length of fiber. FIG. 7 depicts a fundamental concept wherein the features of reduced cross-sectional area and low optical loss bending tolerance permit advantageous reduction of size of such an assembly. A multiplicity of mechanical means not shown can be envisioned within the scope of the invention to accomplish the geometry discussed here. The rod 44 can have a diameter of less than a millimeter and, depending upon various other factors, the assembly can be used, e.g., as a miniature phase delay line or a miniature phase or polarization modulator as one skilled in the art might anticipate.

If the rod 44 is a piezoelectric element capable of supporting radial expansion modes when excited by a driving voltage, the phase of an optical signal passing through the reduced fiber 18 is modulated according to the frequency of the driving voltage. This variation of the basic embodiment shown in FIG. 7 is therefore usable in active systems requiring phase modulation of an optical signal, e.g., fiber optic rotation rate sensors. Using polarization separation means at the input and/or output of a fiber so wrapped on an active rod allows control and/or sensing of variations in the polarization state of the output. Similarly, a fiber so wrapped on a rod 44 that expands or contracts its diameter can act as a phase shift reference arm or sensing arm of an interferometer. Alternatively, if the rod is a passive element, the length of reduced fiber wrapped around the rod determines a fixed optical phase delay relative to a reference fiber path not so wrapped.

Taking care to count the number of turns of fiber wrapped around the rod and/or to fix the angle of the ends of the fiber entering and exiting from the wrapped region fixes both the radius of curvature and the angle of the bend. The assembly of FIG. 7 therefore can serve as an alternative to the grooved fixed angle support shown in FIG. 6 with the added feature that the radius of the bend is fixed by the radius of the rod. The assembly of FIG. 7 is also an example of a support structure, rod 44, in the reduced section 18 being used to anchor bend sensitive transitional tapering regions in substantially straight orientations, e.g. by rigidly mounting rod 44, fiber 10, and end 46.

Normally, when one has tapered a fiber 10 to the reduced diameter, on the order of 20 $\mu$ or less, used in the minibend region 18 of FIG. 7, the optical field is present all around the circumference of the optical fiber. However, by winding the minibends so tightly on a very tiny mandrel (rod 44 diameter less than a millimeter), it appears that the optical field is thrown to the outer circumference of the wrapped coil 42, explaining in part the unexpected resistance of the minibend coil 42 to the severe light loss that would normally occur because of physical contact at the inner circumference of the wrapped coil 42 between the reduced diameter fiber 18 and the rod 44. For a sufficiently tight bend, the internal reflection at the curving glass air interface will be such that the light rays will mostly reflect off the glass air interface all the way around the bend, explaining the relative absence of light loss that would occur for more internal reflections at the glass rod 44 interface.

Figure 7A:
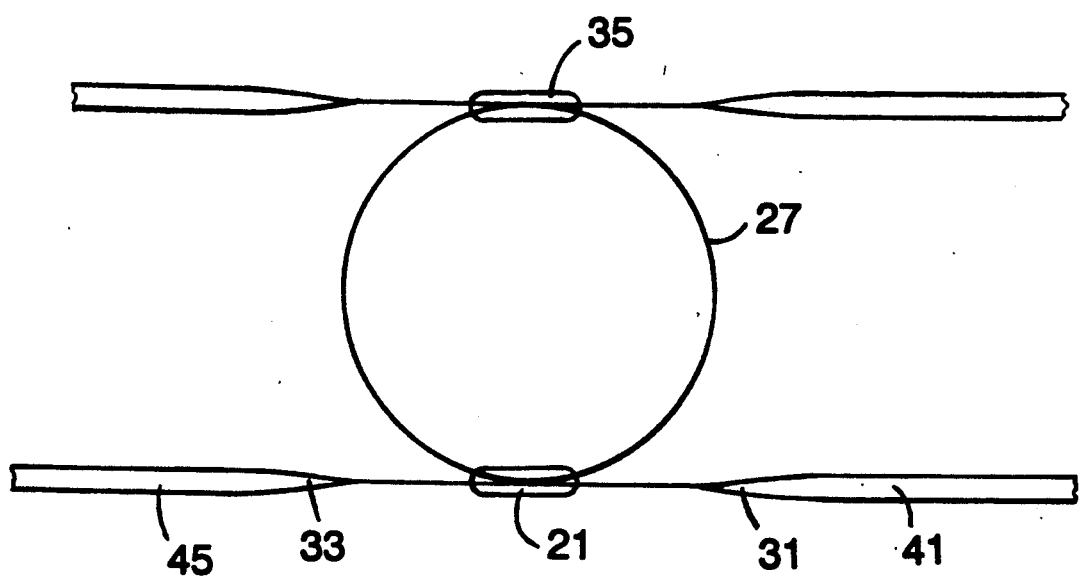
FIG. 7a is a schematic illustration of a miniature resonator incorporating a 360 angular degree miniature bend.

Another device making effective use of a full 360° loop of reduced diameter fiber is shown in FIG. 7a, a miniature resonator, useful in frequency multiplexing on lasers and in types of telecommunications such as line splitting. The diameter of the loop 27 can be on the order of 200 μ. There is at least one coupler on the loop at site 21. The transitional regions 31 and 33 with enhanced bend sensitivity are held straight. Light entering from the right-side fiber 41 cross-couples depending on the coupling fraction of the coupler at 21. Some light exits along left-side fiber 45. The rest of the light enters the loop 27. In a preferred embodiment, the coupler at site 21 has a high coupling fraction of 99% which means that 99% of the light entering from fiber 41 exits along fiber 45, with 1% of the light entering the loop. In the absence of a second coupler at site 35, the 1% of the original light continues circulating in the loop, losing only 1% of its power every time it circulates through the high coupling ratio (99%) coupler at site 21.

At any given time, the total optical power in the loop comprises the sum of light components contributed by each successive pass around the loop. The length of the loop determines a wavelength dependent resonance condition achieved when all the light components circulating in the loop are essentially in phase. When this occurs light at the resonant wavelength constructively interferes and continues to oscillate in the loop for a long period of time. Light circulating at other wavelengths is substantially cancelled by destructive interference. Therefore, light exiting in fiber 45 is substantially devoid of light at non-resonant wavelengths. Alternatively, a second coupler at site 35 can pick up light from the loop and deliver it to a monitor fiber allowing measurement of the amount of light in the loop. The second coupler at site 35 should have a very small coupling ratio, 10% or less, so as not to disturb the light resonating in the loop.

Figure 8:
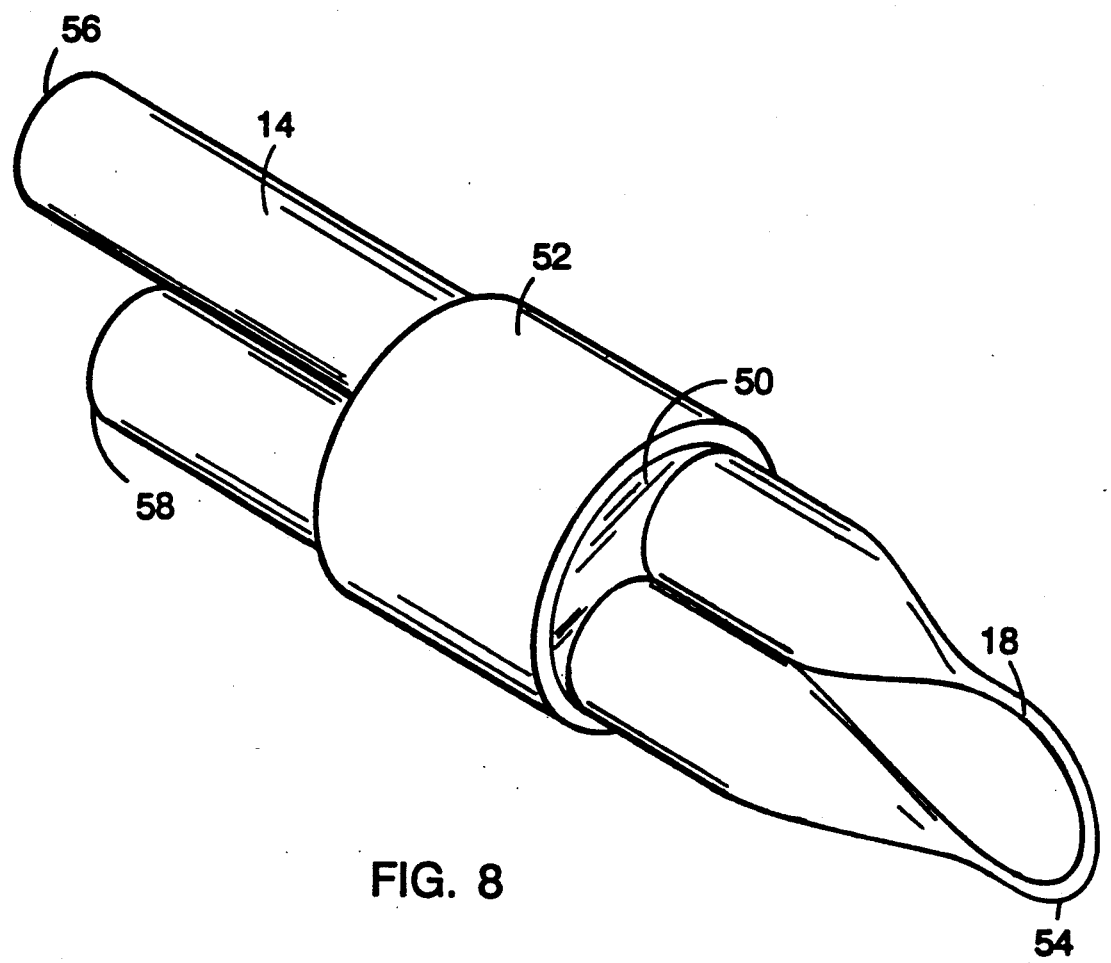
FIG. 8 is a three-dimensional view of a reduced fiber fixed in a 180 angular degree bend.

Shown in FIG. 8 is a 180 degree bend emdodiment. Here a fiber 14 is held by, e.g., adhesive 50 in a sleeve 52. This embodiment might be placed anywhere within a continuous length of fiber although here the fiber ends 56 and 58 are shown truncated for convenience. The region of reduced cross-sectional area 18 makes a full 180 angular degree bend 54. The radius of curvature of the tend is essentially determined by the radius of the original fiber. Such a structure therefore fixes both the radius and angle of the bend. The structure provides, among other things to be discussed later herein, a miniature means to loop a fiber back in the direction from which it came without requiring mirrors and all the attendant alignment optics.

Figure 8A:
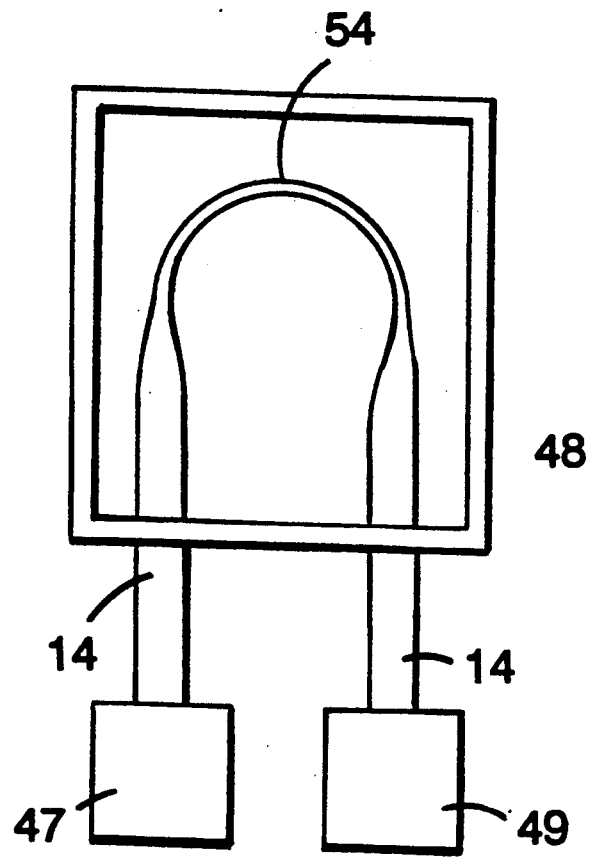
FIG. 8a is a schematic illustration of a practical application of the miniature bend fiber turnaround.

FIG. 8a depicts a practical application of the fiber turnaround of FIG. 8. Shown are two fiberoptic components 47 and 49 connected by fiber 14 which enters protective package 48 and reverses direction through a miniature bend 54 in a very compact volume. Use of the miniature bend in this way allows considerably more flexibility for the design and layout of miniaturized electro-optic circuits than is possible without using the invention. The diameter of the fiber in the miniature bend region 54 does not need to be uniform for the invention to function and could well be a gradually reducing and then increasing taper.

Another form of bend of considerble practical importance is the helix. A helical coil of optical fiber is essentially a coil spring. By advantages of the invention, the helix radius can be of the order of 100 μ. That means that within a diameter less than the diameter of most jacketed fibers a helical coil can be formed thereby providing a region of fiber which can be stretched or compressed like a spring without significant optical power loss. This embodiment therefore forms, e.g., the optical element of a linear slip joint or expansion joint capable of conducting optical power without loss. Without the invention such a joint made of full sized fiber would be several centimeters in diameter.

Figure 9:
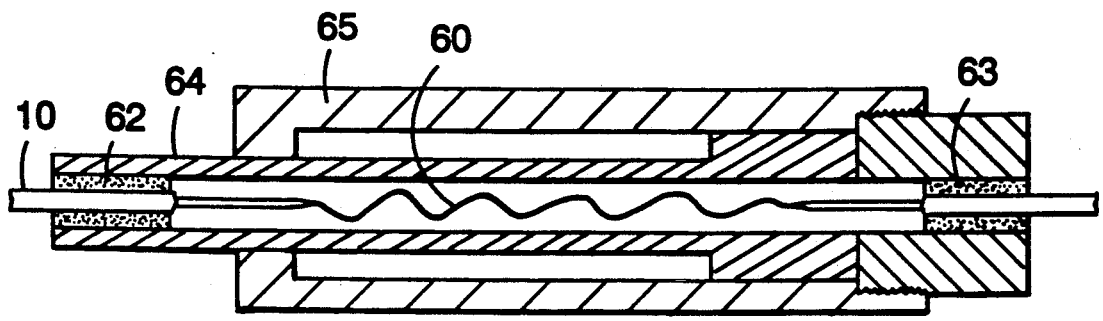
FIG. 9 is a sectional side view of a free standing helical coil of reduced fiber in a linear slip joint application.

The invention, embodied as a helical coil of reduced fiber incorporated into mechanical means to form a linear slip joint is illustrated in FIG. 9. FIG. 9 shows a longitudinal sectional view of a cylindrical mechanical assembly. A jacketed optical fiber 10, processed as previously described, is reduced in cross-sectional area and wound into a helical coil 60. The coil 60, of diameter of a few millimeters, is subsequently mounted with each end fixed by adhesive 62 and 63 in separate mechanical means 64, and 65 which are free to slide, one upon the other. Means 64 and 65 are assembled so that the distance one might slide relative to the other is limited. When means 64 slides upon means 65, the coil of fiber 60 is either extended or compressed in a spring-like fashion. So doing imparts both twisting and bending upon sections of the coil. In FIG. 9 the coil is shown fully compressed. By virtue of the reduced cross-sectional area, a short length of coiled fiber of the order of 5 cm can be made to withstand linear displacements of more than 3 cm.

Figure 10:
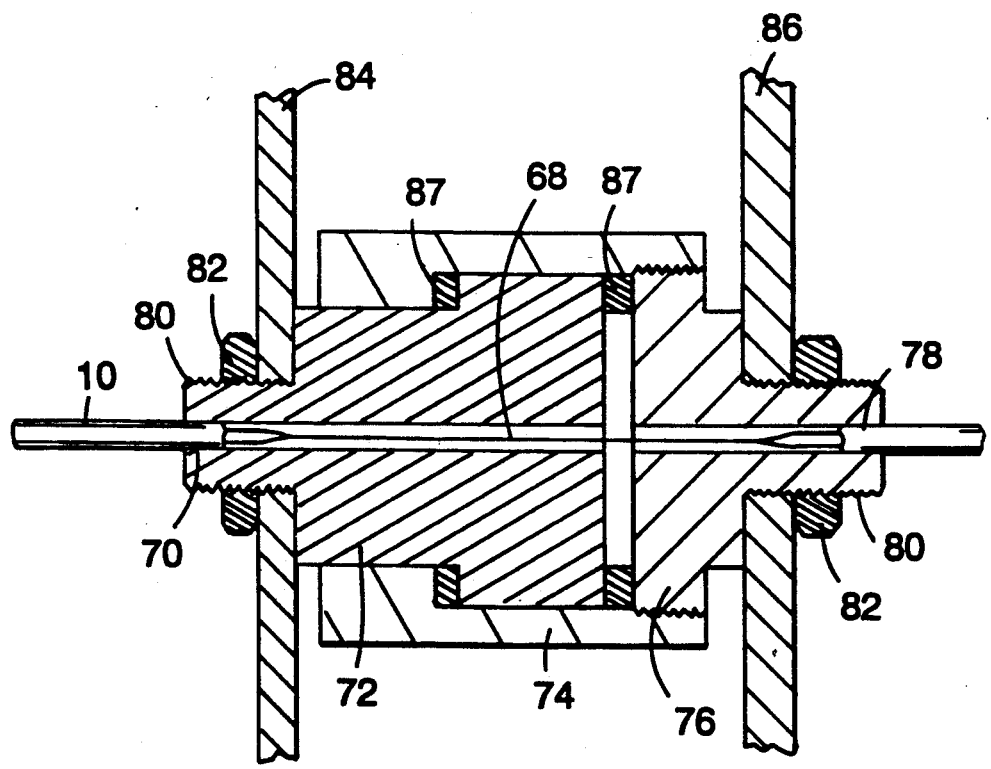
FIG. 10 is sectional side view of a length of reduced fiber mounted in a mechanical means suitable to serve as rotational joint.

Another area of application for fibers of reduced cross-sectional area is rotational connections. As used herein, the term "rotational connection" refers to any means of mechanically connecting two bodies so that the bodies are free to rotate relative to one another about a common axis. FIG. 10 illustrates the basic elements of a typical fiber optic rotational connection embodiment of the invention. FIG. 10 is a longitudinal section view of a cylindrical mechanical assembly. An optical fiber 10 is reduced in cross-sectional area forming a length of about 1 inch of reduced fiber 68. One end 70 of the fiber is fixed in one separate part 72 of the rotational connection using e.g., adhesive. The other separate part of the connection 74 is mated e.g., by threading the end piece 76 into the body 74 to form the mechanical structure of the connection as depicted here. The other end 78 of the fiber is fixed to the end piece 76 of the connection using e.g., adhesive. The separate parts of the connection are free to rotate about the common longitudinal axis and the reduced fiber 68 lies more or less on that axis. The ends of the connection might be threaded as shown 80 and fixed to separate mechanical structures 84, 86 using nuts 82. A pair of bushings or thrust bearings 87 can be used to reduce slack between the mated rotating mechanical surfaces. Details of the particular mechanical design are not pertinent to the invention but serve to illustrate a method of embodiment without implying limitation upon the mechanical variations possible within the scope of the invention.

When the separate parts 72 and 74 of the connection are rotated, torsion is applied to the fiber. Such a connection using about 1 inch of fiber reduced to 1 μ diameter can be rotated through more than 360 angular degrees without breakage or loss of optical power, but clearly there is a limit to the number of turns of rotation possible.

Another embodiment of the invention relates to the miniaturization of electro-optic units. The packaging of miniature electro-optic networks requires means of routing fibers around small radius bends within the small confines of the package. There are numerous situations in which a typical electro-optic unit, such as a fiber optic transceiver, is most efficiently designed to use a single fiber for both input and output. An example is a bi-directional network, the term "bi-directional" implying that signal information can travel in two directions on a single optical fiber. In this application a favored means of separating the received signal and the transmitted signal, each of which travels relatively in opposite directions on the single optical fiber, is through the use of a fiber optic splitter, synonymously known as a fiber optic coupler. A coupler is a bi-directional fiber optic component that distributes optical power present on one or more input fibers to one or more output fibers. Since the coupler is bi-directional, the fibers comprising the input are distinguished from those comprising the output by the function performed rather than by any inherent direction of signal flow.

Figure 11A:
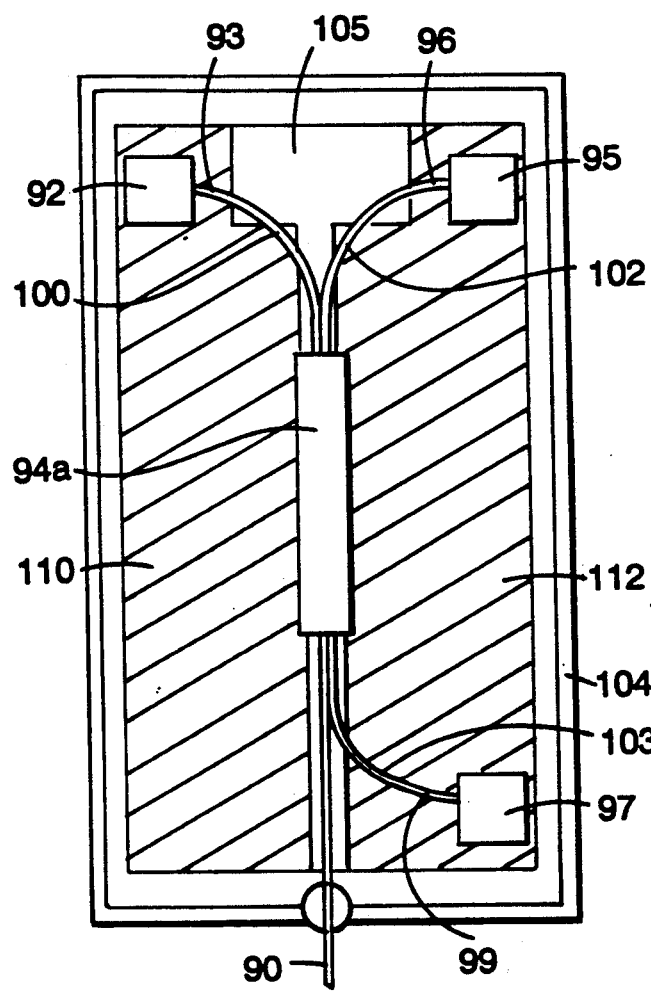
FIG. 11 is a top view of: a) a fiberoptic transceiver using a conventional coupler and full sized fibers; and b) a transceiver featuring a coupler using the invention to avoid large radius fiber bends inside the transceiver package.
Figure 12A:
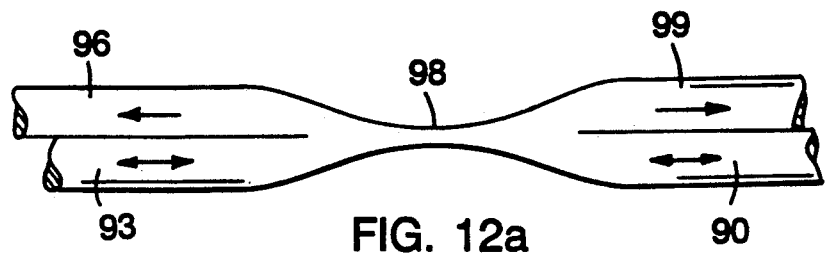
FIG. 12 (a) being a top view of a conventional fused fiber optic coupler formed by thermal draw methods.

As illustrated schematiclly in FIG. 11a, a typical fiber optic transceiver uses a bi-directional single fiber link in and out 90. A source of optical power 92 may be connected to one leg 93 of a fiber optic coupler generally indicated by the numeral 94a. A photodetector 95 is connected to another leg 96 of the coupler 94a on the same side of the coupler as the optical source 92. Light transmitted by the source 92 travels into the coupler 94a, through the optical coupling region and out on the link fiber 90. For additional clarity, FIG. 12a shows the internal structure of a conventional fused fiber coupler as the coupler 94a of FIG. 11a might appear. Fibers in FIG. 12a are labelled to match those in FIG. 11a. The coupling region 98 is generally located in the waist region of the tapered structure.

Light returning on the link fiber 90 passes into the coupler and is therein split in the coupling region 98 so that some percentage of the returning power passes into the leg 96 connected to the photodetector 95. The remaining power is passed back to the source 92 on the other leg 93. Light impinging upon the optical source is of no value to the function of the link. Light impinging upon the detector 95 is detected and interpreted for data content.

Directions of optical power flow are indicated by the arrows drawn on each optical fiber shown in FIG. 12a. Arrows pointing in both directions indicate that optical signals flow bi-directionally in the fibers so labelled.

It is often advantageous to include a monitoring element 97 which might be another photodetector connected to an "output" leg 99 of the coupler. If a monitor element is used as indicated in FIG. 11, it receives some percentage of the transmitted optical power delivered from leg 93 to the coupling region 98.

These three elements, optical source 92, photodetector 95 and coupler 94a, comprise the electro-optic portion of the transceiver. Typically the coupler is the largest item of the three and may measure more than 2 cm long by 5.0 mm in diameter. As is well understood by those familiar with the art of electronics, it is inadvisable if not totally unworkable to place a relatively high powered transmitting circuit in close proximity to a high gain receiving circuit. The circuits driving the optical power source 92 and the photodetector(s) 95 (97) are such circuits and must, in general, be well separated on any circuit board 105 or oscillation and unwanted crosstalk will occur between the circuits. This in turn requires that the fiber optic legs 93 and 96 must be routed to areas of the circuit assembly as far apart as possible. Moreover, these legs might be required to branch in opposite directions requiring at least a 90 angular degree bend in each leg. In FIG. 11a these bends are indicated by the numerals 100, 102, and 103 in legs 93, 96, and 99 respectively. Using conventional fiber, the radius of these bends must be of the order of 1.0 cm or more. Such a transceiver circuit, when placed inside a protective envelope 104, will occupy an area about 1.75 inches (4.45 cm) by 3.0 inches (7.6 cm), i.e., 34 square centimeters regardless of attempts to miniaturize the electronics. The area is mostly required to accommodate the bends 100, 102, 103 and lead lengths of fibers 93, 96, 99 and the coupler. The shaded areas labelled 110 and 112 are available respectively for transmitter and receiver electronics.

Figure 11B:
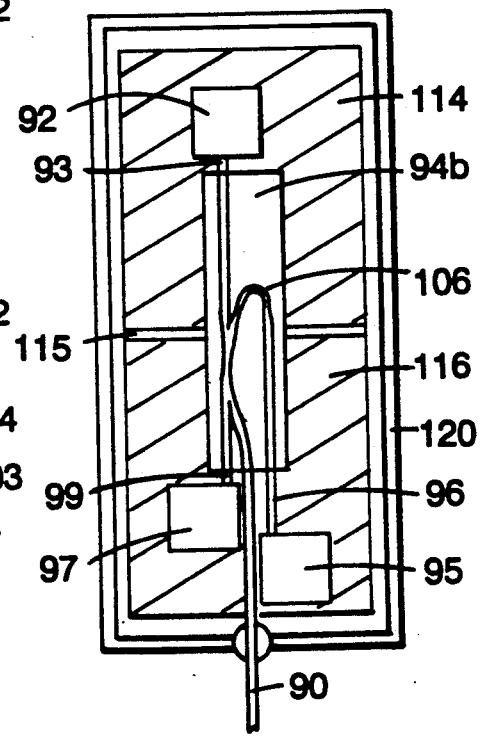
Figure 12B:
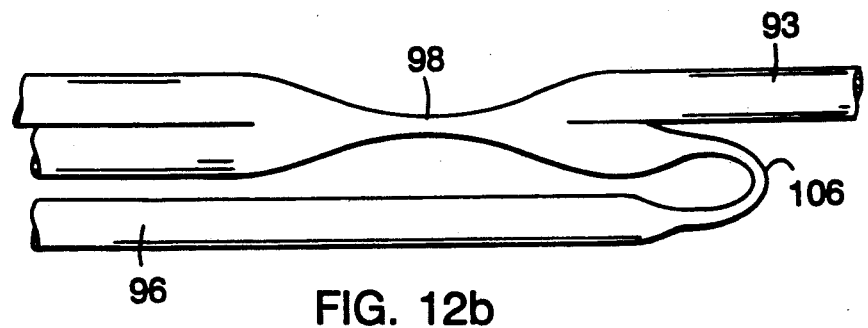

Using the invention in an embodiment illustrated in FIG. 12b allows the fiber optic coupler 94b, the light source 92 and the receiving element 94 to be fabricated in a length of little over 2.0 inches. A typical component layout of these elements is shown in FIG. 11b. This is made possible by the 180 degree bend 106 that loops the receive fiber 96 back beside the coupling region 98 within the coupler body 94b shown in FIG. 11b. Shown in FIG. 12b is a fused fiber optic coupling region of conventional technology integrated with a miniature bend 106 of the invention. When packaged as shown in FIG. 11b the finished coupler is about 2.5 cm long. Because of the advantages of the invention, the coupler allows transmitter 92 and receiver 95 elements to be located at opposite extremes of any circuit board 115 used. No substantial bends in any full sized fiber leads are required thus greatly simplifying the acts of pigtailing the fibers directly in-line to the source 92 and detector 95 and, if desired, to a monitor detector 97. A transceiver using a coupler so configured can be built in a package 120 measuring about 1.0 inches (2.54 cm) by 2.5 inches (6.4 cm) with an area of nominally 16.0 square cm.

As can be seen in FIG. 11b, the shaded areas 114 and 116 indicate the relative space available for transmitter and receiver electronics. These areas are substantially smaller than the comparable areas 110 and 112 of FIG. 11a. Therefore, miniature electronics, e.g., SMD technology, can now be advantageously used to achieve package size reduction.

The guiding in the miniature bend region is extremely strong because of the effective air cladding, so light can be bent through tighter bends using the present miniature bend invention than is possible using even integrated optic or planar waveguide structures. This is because the glass core in planar waveguide structures invariably can physically contact some solid materials on the structures with different refractive index leading to light loss, whereas the miniature bend is completely immersed by air (or vacuum) thereby avoiding any physical contact with solid matter. Thus, the miniature bend can be used advantageously over integrated optics in creating very small structures in which sources, detectors, and couplers are made in small packages such as shown in FIG. 11b.

The embodiment of FIG. 12b illustrates that the invention can be advantageously integrated with another fiberoptic device such as a coupler. Since fused fiberoptic couplers are made by thermal drawing methods, and the miniature bends of the invention are readily fabricated using the same tooling, manufacturers of fused fiberoptic couplers can, with little additional effort, vary their coupler packaging to meet the needs of electro-optic miniaturization.

There are other novel embodiments of the invention pertinent directly to the fabrication of fiber optic couplers. For example, two or more structures like that shown in FIG. 8 can be joined by thermal fusion or adhesive techniques to form the coupling structures illustrated in FIG. 13 and 14. To understand the operation of this embodiment it is only necessary to realize that the optical field travelling around a bent fiber of reduced cross-sectional area is distributed with most of the optical energy concentrated near the outer circumference of the bend. When two bends are thus brought into contact, evanescent coupling occurs.

The percentage of light coupled from one fiber to another is proportional to the length of the region over which coupling can occur. In the embodiment shown in FIG. 13, the coupling region 130 comprises the relatively short region of tangency between the two miniature bends 132 and 134. This region wherein the fibers are optically joined may result from thermally fusing the fibers in the vicinity of tangency 130 or by the application of a relatively low index adhesive. Since the length of the coupling region thus attained may be quite small, the amount of light tapped from the feed fiber, e.g., 136 into an output fiber, e.g., 137 is also quite small. It is normally difficult to make couplers with repeatably small coupling coefficients using the conventional methods of fused biconical tapering. The invention provides a means that is suited to easy control of small coupling coefficients.

Couplers made using tangent miniature bends in fibers of reduced cross-sectional area represent a new type of fiber optic coupler. Not only is the method of fabrication entirely new, but the lead configuration is different from conventional tapered couplers of structure similar to that illustrated in FIG. 12a. Comparing the lead configuration of the coupler of FIG. 13 to the requirements of source and detector separation discussed in relation to FIGS. 11a and 11b, it can be seen that the coupler of FIG. 13 is well suited to transceiver applications.

Figure 13:
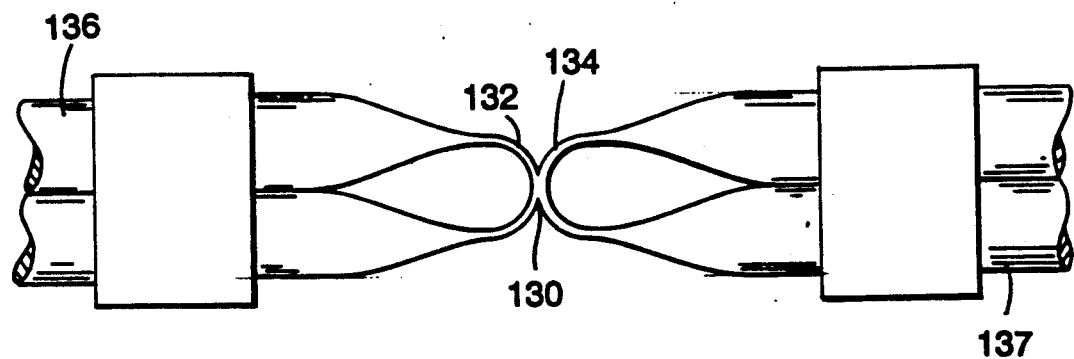
FIG. 13 is a side view of a coupler formed between two sections of reduced fiber.

The miniature bend coupler of FIG. 13 is a coupler that can be made into a very compact format. In addition, miniature bend couplers such as shown in FIG. 13 allow a greater flexibility in the design of fiberoptic devices by giving an alternative arrangement of the optical fibers. For instance, the input and throughput fibers 136 both come out the left side of the coupling region 130 whereas the cross-coupled fibers 137 both come out the right side. Conventional couplers such as in FIG. 12a have input fiber 93 and throughput fiber 90 on opposite sides of the coupling region 98.

Instead of fusing fibers 136 and 137 together in the coupling region 130, an alternative is to merely twist fibers 136 and 137 around each other. Such a construction combines miniature bend technology with twisted reduced integrated fiber technology.

Figure 14:
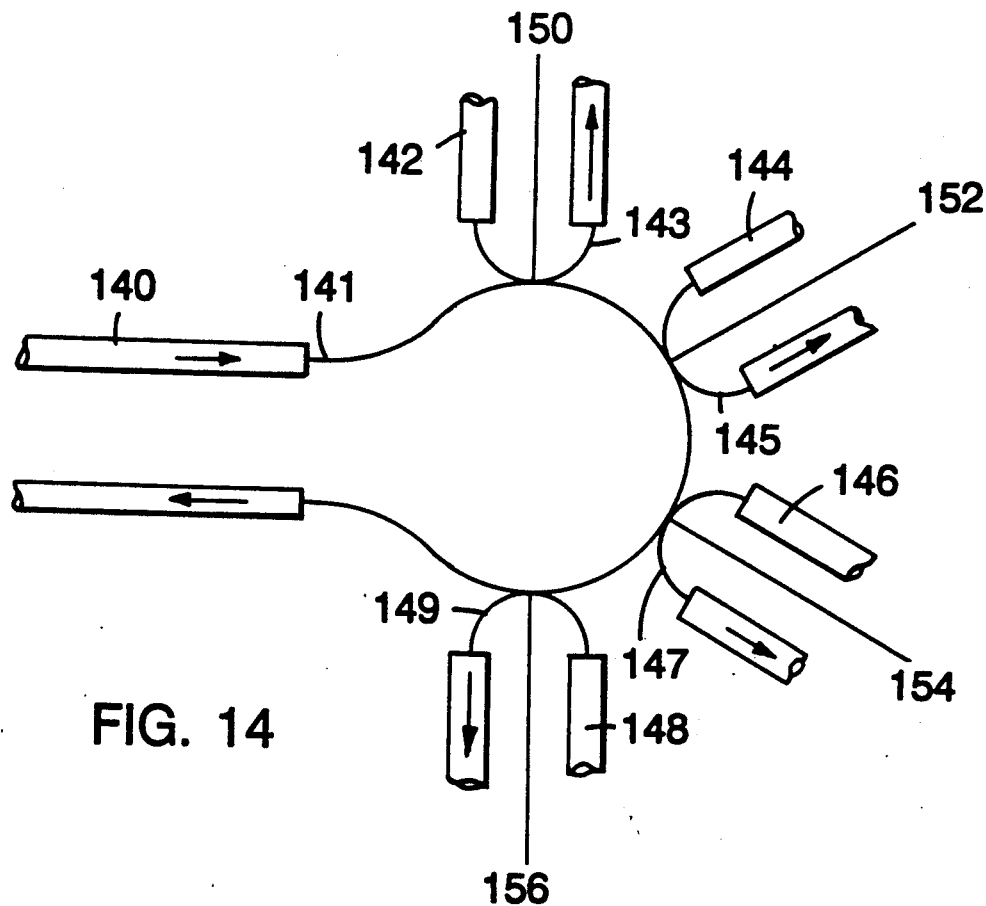
FIG. 14 is a top view schematically illustrating multiple coupler junctions formed between loops of reduced diameter fiber.

Extending the concepts of FIG. 13 provides multiple low coupling coefficient taps as illustrated schematically in FIG. 14. Here optical power, represented by the arrows, enters on a full sized fiber 140. Fiber 140 is reduced to a smaller cross-sectional area 141 and formed into a loop. Tangent couplers of the type illustrated in greater detail in FIG. 13 are formed between the reduced sections 143, 145, 147, 149 of fibers 142, 144, 146, 148 respectively at locations 150, 152, 154, and 156 around the loop 141. Optical power flowing into the loop of reduced fiber 141 from the full sized fiber 140 is coupled in some amount into each of the reduced fibers 143, 145, 147, and 149 and flows out in the full sized sections of fibers 142, 144, 146, and 148 in the sense indicated by the arrows. These couplers are, of course, bi-directional, so that light may be input or output in any direction or in more than one direction simultaneously on any or all of the fibers according to the respective coupling percentages of each coupler. The embodiment shown in FIG. 14 is therefore a type of star coupler particularly well suited to fabrication using single mode optical fiber. It should be pointed out that the loss of optical power in both embodiments of FIG. 13 and FIG. 14 is quite low. The tangent star coupler can be fabricated in a package approximately 2.5 cm square by 3.0 mm thick making it the smallest low-loss single mode "star coupler" presently known.

Making each of the couplings of small percentage, one could extrapolate FIG. 14 to include hundreds of miniature bend couplers on the same fiber. Alternatively, the main bus fiber 140 need not be of the same reduced diameter as the other fibers in the miniature bend couplers, especially if there are many miniature bend couplers each with about 1% coupling. In either embodiment, a miniature bend network bus can be used to tap and distribute signals and information to many different instruments, computers, and data sources forming a general node.

Drawing also allows one to prepare two fibers of differing optical characteristics from one original stock fiber. Fibers of different cross-sectional area have different optical propagation constants. This fact can be advantageously used to fabricate, e.g., couplers with enhanced or diminished wavelength dependence. Using the invention, one can reduce a region of one or more fiber prior to fusing to form the coupler. One skilled in the art of fused coupler fabrication will appreciate the advantage of the invention in this context. Depending upon the reduction difference between fibers and other parameters of the coupler fusion draw, couplers can be made to exhibit modified coupling behavior at different wavelengths.

Fibers which have been drawn by any of the methods described above may be subsequently processed by etching or machining. The invention offers advantages to one who wishes to produce a polished evanescent wave coupler. If the diameter of the fiber is first reduced, less polishing is required to reach the evanescent field of the core. Etching is a viable method of reducing the fiber for such an application, but etched fibers tend to be more fragile than drawn fibers leaving drawing as the preferred approach. Drawing tends to produce slightly longer structures, in general, but is a less complicated processing technique than etching, reinforcing the preference for drawing.

While the thermal drawing methods are common to the manufacture of fused fiberoptic couplers and miniature bends in preferred embodiments, one nonobvious aspect of the miniature bend invention involves the realization that a fiber tapered down by such methods can be bent so substantially without incurring unacceptable light loss. Another nonobvious aspect is that once such a fiber has been thinned down to the bend insensitive reduced diameter regime, all the mechanical attributes that give rise to a shortening of the fiber lifetime are also reduced. A fiber constructed according to the miniature bend invention can be bent, for example, into a bend of radius 100 $\mu$ without having internal stresses destroy the fiber. The tapering conventional to fused fiberoptic coupler fabrication is to facilitate evanescent energy transfer from one fiber to another whereas the tapering in the case of a miniature bend is to attenuate loss of evanescent energy from a bent fiber to the external environment. It has not previously been known or its importance appreciated that by continuing to taper a fiber down after reaching a diameter of increased bend sensitivity, one eventually reaches a bend insensitive regime of substantially reduced fiber diameter in which one should locate bends.

Figure 15:
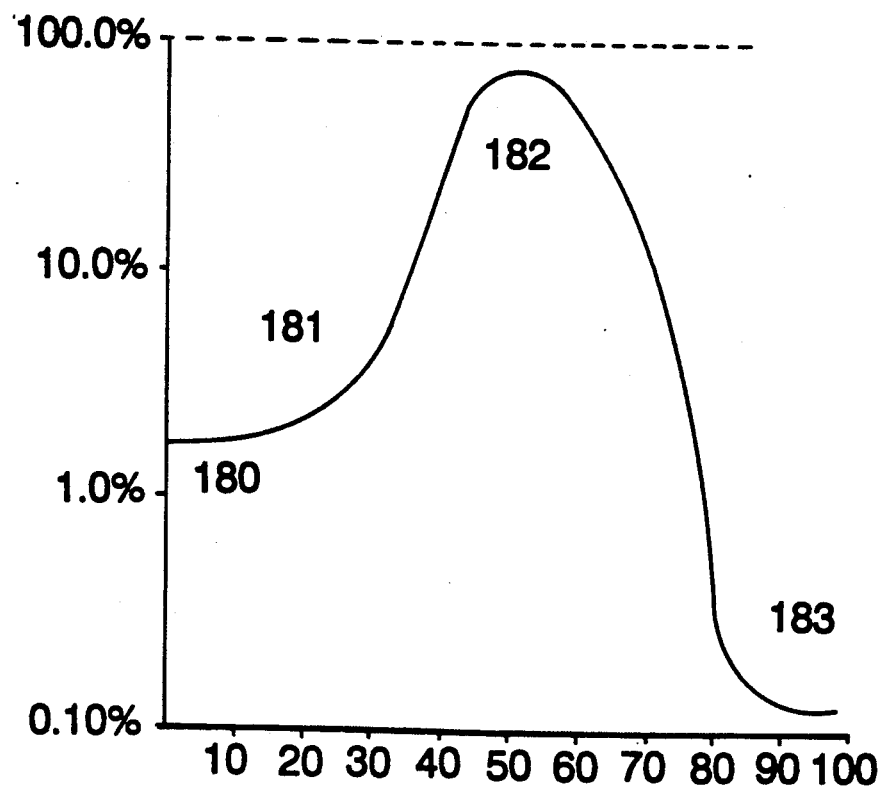
FIG. 15 is a curve characteristic of a constant radius of curvature bend showing the bending loss plotted on the vertical axis as a function of percentage of cross-sectional area reduction plotted on the horizontal axis.

FIG. 15 presents a curve characteristic of the observed phenomena. The exact values of loss for a given percentage of cross-sectional area reduction vary depending upon the physical properties of the type of optical fiber used. The curve shown in FIG. 15 illustrates diagrammatically the general behavior of single mode fibers. A particular fiber that can be used is a Corning Telecommunications single mode fiber, with about a 9 $\mu$ diameter core and 125 $\mu$ diameter cladding, nominally designed to operate at wavelengths of 1300 nanometers (nm).

FIG. 15 is a representation of what can be predicted by bending an optical fiber around a mandrel of fixed radius. Specimens of different cross-sectional area reduction produced by drawing can each be bent 45 angular degrees around the same mandrel and the optical power throughput of the bent fiber can be compared to the optical power throughput of the same specimen without bending.

In FIG. 15 the point labelled 180 indicates the loss present for an original, full-size fiber bent to a radius of 1.0 cm. The curve 181 depicts the optical power loss for the same radius bend as the fiber diameter is decreased by drawing. Optical power loss, shown on the vertical axis of FIG. 15, is logarithmic and is therefore compressed for graphic convenience. The degree of diameter reduction is indicated on the horizontal axis of FIG. 15. In the range of 40% to 80% diameter reduction, the loss of the subject bend peaks 182 dramatically. Beyond about 90% diameter reduction 183, the loss becomes very small for the same radius bend. The invention operates in that low loss regime.

What is claimed is:

1. A fiber optic path defined by an optical fiber having a solid transparent core and, over the main length of the fiber, a solid transparent outer clad layer, a portion of said clad layer of index of refraction less than that of said core such that said fiber conducts light by internal reflection attributable to the difference in index of refraction between said core and said portion of said solid clad layer, a selected region of the length of said fiber being exposed to an external environment having an index of refraction substantially lower than that of said solid clad layer, said fiber in said selected region being reduced in diameter in a manner to cause said fiber to conduct light by internal reflection attributable at least in part to the difference in index of refraction at the interface between the exterior of said fiber and said external environment whereby light energy can be transmitted through said region with substantially lower bend-loss than that of the main length of said fiber, said fiber in said region being oriented differently from an adjacent portion of the main length of the fiber without substantial light loss attributable to said orientation.

2. The fiber optic path of claim 1 wherein in said selected region, said fiber has a substantial bend that orients the main length of said fiber on one side of said selected region at a substantial angle to the axis of said selected region or the main length of said fiber on the other side of said region, the lower index of refraction of said external environment at said bend enabling transmission of light energy through said bend with substantially less bend-loss than would occur in the main length of said fiber in said region.

3. The fiber optic path of claim 1 or 2 wherein said optical fiber is a multimode fiber and, in a region adjacent said selected region, said clad is substantially removed while said core retains a sufficient diameter to guide substantially all light modes guided by the main length of said fiber.

4. The fiber optic path of claim 3 wherein in said selected region said core is smaller than in the main length of said fiber.

5. A joint assembly comprising the fiber optic path of claim 1 or 2 wherein said regions of said fiber adjacent said selected region are secured in respective members of a joint which are movable with respect to each other to a limited extent with corresponding bending of said selected region.

6. The joint assembly of claim 5 in the form of a slip joint wherein said fiber in said selected region is bent into the form of a helical coil such that when said members move toward each other said helical coil is compressed and when said members move away from each other said helical coil is expanded.

7. The joint assembly of claim 5 in the form of a rotary joint wherein said adjacent regions of said fiber are secured in members of a rotatable joint, said members being rotatable with respect to each other about an axis defined by said fiber in said selected region, said rotation twisting said fiber.

8. The fiber optic path of claim 2 wherein said substantial angle is about 90°.

9. The fiber optic path of claim 2 wherein said substantial angle is about 180°.

10. An optic coupler device to which one end of the fiber optic path of claim 9 is connected.

11. An optic coupler device formed of a plurality of optic fibers, an extension of one of said fibers forming the fiber optic path of claim 9.

12. A fused fiber optic coupler device comprising at least two of said fiber optic paths of claim 9 wherein said substantial bends of said fiber optic paths are fused form a coupling region of said device.

13. An electro-optic device incorporating the fiber optic coupler device of claim 10.

14. A twisted fiber optic coupler device comprising at least two of said fiber optic paths of claim 4 wherein said substantial bends of said fiber optic paths are twisted about one another to form a coupling region of said device.

15. A miniature bend network bus comprising at least one of said fiber optic paths of claim 4 wherein said substantial bend of said fiber optic path is coupled to an optic fiber with a coupling ration less than about 1%.

16. The fiber optic path of claim 2 wherein the radius of curvature of the bend is less than 1000 times the radius of the core of the unaltered main length of the fiber.

17. The fiber optic path of claim 2 wherein said selected region is bent tightly around a small diameter support.

18. The fiber optic path of claim 17 wherein said selected region is wrapped a multiplicity of turns around said small diameter support.

19. An angled fiber optic connector device comprising the wrapped small diameter support of claim 17.

20. A phase modulator device comprising the wrapped small diameter support of claim 17 wherein said support is expandable and contractible in a direction perpendicular to an axis of said support, said expansion and contraction modulating a length of said fiber in said selected region in said wrapped small diameter support effectively causing a phase shift in light passing through said phase modulator with respect to light passing through an independent reference light path.

21. An interferometer incorporating the phase modulator of claim 20.

22. The phase modulator of claim 20 wherein said support is piezoelectric.

23. A fiber optic connector device incorporating the fiber optic path of claim 2.

24. The fiber optic connector device of claim 23 in which said fiber optic path extends from a fiber butt end forming a connection interface having a first axis of orientation through said bend to a fiber portion having an axis lying at a substantial angle to said first axis.

25. The fiber optic connector device of claim 23 or 24 wherein said bend is suspended in a void in said connector device.

26. A coil comprising the fiber optic path of claim 2 wherein said fiber in said selected region is bent into the form of a helical coil.

27. An angled fiber optic connector device comprising the coil of claim 26.

28. A resonator comprising the fiber optic path of claim 2 wherein said substantial angle is about 360° forming a loop and said selected region is fused to itself in the form of a very high coupling ratio coupler, said high coupling ratio being about 99%.

29. The resonator of claim 28 wherein said loop comprises a second coupler in the form of a very low coupling ratio coupler, said low coupling ratio being about 10%.

30. A fiber optic coupler incorporating the fiber optic path of claim 2 as one of the fibers comprising the coupler, the coupling region of said coupler formed by joining said bend region of reduced cross-section of said fiber with at least one other region of reduced cross-section fiber.

31. A package comprising first and second optical components mounted on a rigid support and connected by the fiber optic path of claim 2.

32. The package of claim 31 wherein said first optical component is an optic coupler and the second component is selected from the group consisting of light emitters and light detectors.

33. The package of claim 32 wherein said package comprises a transceiver comprising a coupler, a light emitter and a light detector.

34. The fiber optic path of claim 1 wherein the exterior of said fiber is exposed to air in said selected region.

35. The fiber optic path of claim 1 wherein the exterior of said fiber is exposed to vacuum in said selected region.

36. The fiber optic path of claim 1 wherein the exterior of said fiber is exposed to a transparent fluid in said selected region.

37. The fiber optic path of claim 1 wherein said optical fiber has a transition region joining said selected region, the thickness of said clad decreases gradually toward said selected region, said transition region having increased bend-loss-sensitivity, said transition region having a substantially straight orientation.

38. The fiber optic path of claim 37 wherein said transition region tapers to smaller diameter in the direction of said selected region.

39. The fiber optic path of claim 37 wherein, in said transition region, said clad reduces in thickness and said core reduces in diameter toward said selected region as the result of draw-formed taper of said fiber.

40. The fiber optic path of claim 37 wherein said transition region and said selected region are the product of etching away of a portion of the solid clad and draw-forming.

41. The fiber optic path of claim 37 wherein said selected region is the product of etching away of at least most of the solid clad.

42. The fiber optic path of claim 37 wherein said transition region lies on each side of said selected region and joins a portion of the main length of said fiber.

43. The fiber optic path of any of claims 37-42 wherein said fiber is a single mode fiber.

44. The fiber optic path of any of claims 37-42 wherein said fiber is a multimode fiber.

45. A fiber optic coupler incorporating the fiber optic path of claim 1 as one of the fibers comprising the coupler, a substantial bend being formed in said region of reduced cross-sectional area of said fiber, said substantial bend orienting an adjoining main length of nonreduced cross-sectional area of said fiber at an angle to the axis of the coupling region of said coupler, said bend being integrated within a protective package with the coupler.

* * * * *

UNITED STATES PATENT AND TRADEMARK OFFICE
CERTIFICATE OF CORRECTION

PATENT NO. : 5,138,676            Page 1 of 2
DATED : August 11, 1992
INVENTOR(S) : David W. Stowe, et al It is certified that error appears in the above-indentified patent and that said Letters Patent is hereby corrected as shown below:

On the title page: Item [56]

Under "OTHER PUBLICATIONS", "Szarka ..." insert --, p. 258-- after "1980";

Col. 2, line 5; insert --.-- after "result";
"again" should be --Again--;

Col. 3, line 67; "so id" should be --solid--;

Col. 8, line 63; "$V = (2\pi/) r_c - (N_1^2 - N_2^2)$" should be
--$V = (2\pi/\eta) r_c - (N_1^2 - N_2^2), \eta$--

Col. 10, line 35; delete " / " after "is,"
line 63, delete "e)" after "d)"

UNITED STATES PATENT AND TRADEMARK OFFICE
CERTIFICATE OF CORRECTION

PATENT NO. : 5,138,676
DATED : August 11, 1992
INVENTOR(S) : David W. Stowe, et al It is certified that error appears in the above-indentified patent and that said Letters Patent is hereby corrected as shown below:

Col. 14, line 44; "cf" should be --of--;

Col. 15, line 38; "I1" should be --11--;

Col. 16, line 4; delete "." after "pleasing";

Col. 20, line 38; "cf" should be --of--;

Col. 25, line 4; "ration" should be --ratio--.

Signed and Sealed this

Twenty-sixth Day of October, 1993

Attest:

BRUCE LEHMAN

*Attesting Officer*     *Commissioner of Patents and Trademarks*